United States Patent
Sheedy et al.

(10) Patent No.: US 12,244,561 B2
(45) Date of Patent: Mar. 4, 2025

(54) PREVENTING DATA LOSS USING ENHANCED ANALYSIS OF THE URLs AND URIs IN WEBPAGE REQUESTS

(71) Applicant: Bank of America Corporation, Charlotte, NC (US)

(72) Inventors: Jonathan Sheedy, Poynton (GB); Donald Hess, Charlotte, NC (US); Steven Sinks, Scottsdale, AZ (US)

(73) Assignee: Bank of America Corporation, Charlotte, NC (US)

( * ) Notice: Subject to any disclaimer, the term of this patent is extended or adjusted under 35 U.S.C. 154(b) by 244 days.

(21) Appl. No.: 17/840,038

(22) Filed: Jun. 14, 2022

(65) Prior Publication Data
US 2023/0403256 A1    Dec. 14, 2023

(51) Int. Cl.
*H04L 9/40* (2022.01)
*G06F 16/955* (2019.01)

(52) U.S. Cl.
CPC ...... *H04L 63/0236* (2013.01); *G06F 16/9566* (2019.01); *H04L 63/0281* (2013.01); *H04L 63/1416* (2013.01)

(58) Field of Classification Search
CPC ............. H04L 63/0227; H04L 63/0236; H04L 63/0281; H04L 63/101; H04L 63/1416; H04L 63/1441; H04L 63/1466
See application file for complete search history.

(56) References Cited

U.S. PATENT DOCUMENTS

| | | | |
|---|---|---|---|
| 8,528,093 B1* | 9/2013 | Kureha | G06F 21/566 |
| | | | 726/25 |
| 9,419,989 B2 | 8/2016 | Harris et al. | |
| 9,992,217 B2 | 6/2018 | Taylor et al. | |
| 10,567,407 B2 | 2/2020 | Tang et al. | |
| 11,146,576 B1* | 10/2021 | Mushtaq | H04L 63/1416 |
| 11,985,145 B1* | 5/2024 | Mushtaq | H04L 63/1483 |
| 2008/0140626 A1* | 6/2008 | Wilson | G06F 16/951 |
| 2009/0089857 A1* | 4/2009 | Sabin | H04L 61/301 |
| | | | 726/1 |
| 2009/0328153 A1* | 12/2009 | Chetuparambil | G06N 5/046 |
| | | | 726/4 |
| 2015/0170072 A1* | 6/2015 | Grant | H04L 63/0263 |
| | | | 705/7.36 |
| 2016/0164892 A1* | 6/2016 | Satish | H04L 63/1433 |
| 2017/0134415 A1* | 5/2017 | Muddu | G06F 3/0484 |

(Continued)

*Primary Examiner* — Eric W Shepperd
(74) *Attorney, Agent, or Firm* — Banner & Witcoff, Ltd.

(57) ABSTRACT

Aspects of the disclosure relate to preventing data loss using enhanced analysis of the URLs and URIs in webpage requests. A computing platform may receive a user request to access a webpage, and may determine whether the webpage is regularly accessed by the user and whether the user is permitted to access the webpage. Based on determining the user might not regularly access the website, but that the user is permitted to access the webpage, the computing platform may engage an artificial intelligence (AI) engine to parse the URL and URI from the webpage request. The AI engine may compare the URL to source code associated with the webpage to determine whether the URI was re-written. The computing platform may grant the webpage request based on determining the source code corresponds to the URL and based on determining the URI might not have been re-written.

15 Claims, 12 Drawing Sheets

(56) References Cited

U.S. PATENT DOCUMENTS

| | | | |
|---|---|---|---|
| 2018/0075256 A1* | 3/2018 | Robinson | H04L 63/1466 |
| 2019/0068616 A1* | 2/2019 | Woods | H04L 63/145 |
| 2020/0285737 A1* | 9/2020 | Kraus | G06F 21/552 |
| 2021/0097168 A1* | 4/2021 | Patel | G06F 21/554 |
| 2021/0194919 A1* | 6/2021 | Lindemann | H04L 9/321 |
| 2021/0240825 A1* | 8/2021 | Kutt | G06F 21/563 |
| 2022/0046057 A1* | 2/2022 | Kutt | H04L 63/145 |
| 2022/0394052 A1* | 12/2022 | Grossman-Avraham | G06F 21/552 |
| 2024/0015182 A1* | 1/2024 | Kim | H04L 63/1416 |

\* cited by examiner

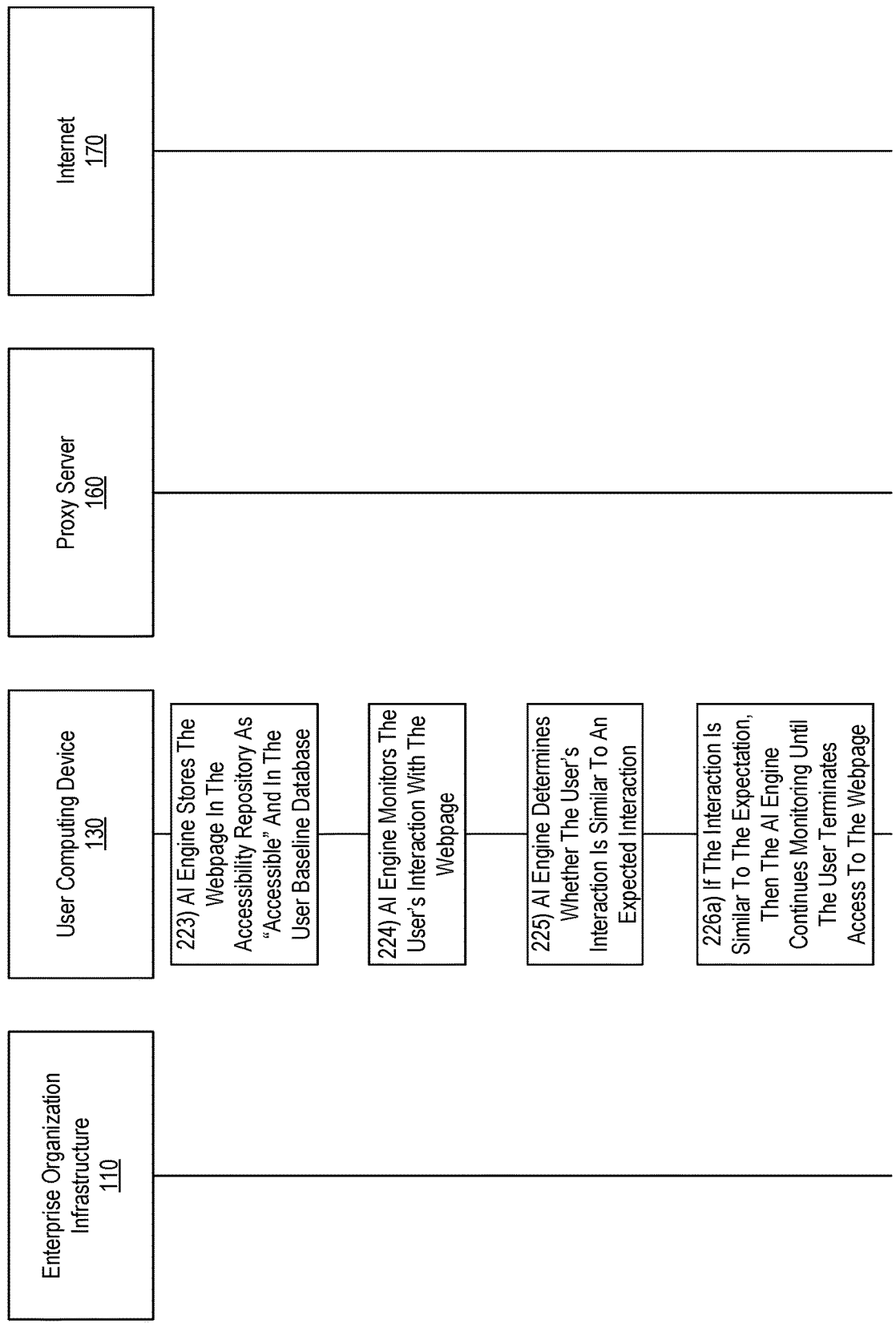

PREVENTING DATA LOSS USING ENHANCED ANALYSIS OF THE URLs AND URIs IN WEBPAGE REQUESTS

BACKGROUND

Aspects of the disclosure relate to hardware and/or software for preventing data loss using enhanced analysis of the uniform resource locators (URLs) and uniform resource identifiers (URIs) in webpage requests. In particular, one or more aspects of the disclosure relate to parsing a webpage request to identify a URL and a URI that correspond to the requested webpage, comparing the URL to source code associated with the requested webpage, and determining whether to permit or to deny access to the requested webpage based on whether the source code corresponds to the URL.

One aspect of current data loss prevention protocols permits an enterprise organization to deny access to a plurality of webpages based on determining the webpage request may correspond to a malicious, or potentially malicious, webpage or content (e.g., a webpage that accesses sensitive enterprise organization data, a webpage that provides instructions on how to access sensitive enterprise organization data, or the like). To determine whether the webpage request corresponds to a malicious, or potentially malicious, webpage, the enterprise organization may parse the webpage request to identify a URL that corresponds to the requested webpage. The enterprise organization may compare the URL to enterprise organization guidelines that indicate a plurality of permissible webpages (e.g., a list of webpages that the enterprise organization deemed "accessible", a list of webpages that the enterprise organization deemed "inaccessible", or the like). If the enterprise organization determines that the URL corresponds to an "inaccessible" webpage, then the enterprise organization may deny access to the requested webpage. On the other hand, if the enterprise organization determines that the URL corresponds to an "accessible" webpage, then the enterprise organization may permit access to the requested webpage.

However, when permitting access to the requested webpage, the enterprise organization fails to consider both the URI that follows the URL and a user baseline (e.g., whether a user is permitted access to a webpage based on the user's role within the enterprise organization, whether a user is permitted to access a webpage based on the frequency with which the user interacts with the webpage, or the like). Without analyzing the URI associated with the URL, the enterprise organization is unable to detect whether the URI has been re-written to re-direct an "accessible" URL to a malicious, or potentially malicious, webpage or content. Furthermore, without considering the user baseline, the enterprise organization fails to explore the legitimacy of the webpage request. Therefore, current data loss prevention protocols fail to detect re-written URIs, to consider the consequences of permitting users to access webpages associated with re-written URIs, and to protect sensitive enterprise organization data from the webpages associated with re-written URIs.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with preventing data loss using enhanced analysis of the URLs and URIs in webpage requests.

In accordance with one or more embodiments, a method may comprise, at a computing device including at least one or more processors and memory, transmitting, by a user and to a proxy server, a request to access a webpage. The method may comprise determining, by the proxy server, whether the webpage is included in a baseline associated with the user, or the webpage is not included in the baseline associated with the user. The method may comprise, based on determining the webpage is not included in the baseline associated with the user, determining, by the proxy server and using an accessibility repository, whether the webpage is accessible, or the webpage is inaccessible. The method may comprise, based on determining the webpage is accessible, instructing an artificial intelligence model to analyze the webpage. The method may comprise parsing, by the artificial intelligence model, a URL and a URI associated with the request. The method may comprise determining, by the artificial intelligence model, whether the URI corresponds to source code associated with the webpage, or the URI fails to corresponds to the source code. The method may comprise, based on determining that the URI fails to correspond to the source code, flagging, by the artificial intelligence model, the webpage as malicious. The method may comprise transmitting, by the artificial intelligence model and to the proxy server, instructions to deny the request to access the webpage. The method may comprise storing, by the artificial intelligence model, the webpage in the accessibility repository. The method may comprise transmitting, by the proxy server and to the user, a notification indicating denial of the request to access the webpage.

In accordance with one or more embodiments, a computing platform may comprise a processor, a communication interface communicatively coupled to the processor, and memory storing computer-readable instructions that, when executed by the processor, cause the computing platform to transmit, by a user and to a proxy server, a request to access a webpage. The computing platform may determine, by the proxy server, whether the webpage is included in a baseline associated with the user, or the webpage is not included in the baseline associated with the user. The computing platform may, based on determining the webpage is not included in the baseline associated with the user, determine, by the proxy server and using an accessibility repository, whether the webpage is accessible, or the webpage is inaccessible. The computing platform may, based on determining the webpage is accessible, instruct an artificial intelligence model to analyze the webpage. The computing platform may parse, by the artificial intelligence model, a URL and a URI associated with the request. The computing platform may determine, by the artificial intelligence model, whether the URI corresponds to source code associated with the webpage, or the URI fails to corresponds to the source code. The computing platform may, based on determining that the URI fails to correspond to the source code, flag, by the artificial intelligence model, the webpage as malicious. The computing platform may transmit, by the artificial intelligence model and to the proxy server, instructions to deny the request to access the webpage. The computing platform may store, by the artificial intelligence model, the webpage in the accessibility repository. The computing platform may transmit, by the proxy server and to the user, a notification indicating denial of the request to access the webpage.

In accordance with one or more embodiments, one or more non-transitory computer-readable media storing instructions that, when executed by a computing platform comprising at least one processor, memory, and communication interface, cause the computing platform to transmit, by a user and to a proxy server, a request to access a webpage. The instructions, when executed, may cause the computing platform to determine, by the proxy server, whether the webpage is included in a baseline associated with the user, or the webpage is not included in the baseline associated with the user. The instructions, when executed, may cause the computing platform to, based on determining the webpage is not included in the baseline associated with the user, determine, by the proxy server and using an accessibility repository, whether the webpage is accessible, or the webpage is inaccessible. The instructions, when executed, may cause the computing platform to, based on determining the webpage is accessible, instruct an artificial intelligence model to analyze the webpage. The instructions, when executed, may cause the computing platform to parse, by the artificial intelligence model, a URL and a URI associated with the request. The instructions, when executed, may cause the computing platform to determine, by the artificial intelligence model, whether the URI corresponds to source code associated with the webpage, or the URI fails to corresponds to the source code. The instructions, when executed, may cause the computing platform to, based on determining that the URI fails to correspond to the source code, flag, by the artificial intelligence model, the webpage as malicious. The instructions, when executed, may cause the computing platform to transmit, by the artificial intelligence model and to the proxy server, instructions to deny the request to access the webpage. The instructions, when executed, may cause the computing platform to store, by the artificial intelligence model, the webpage in the accessibility repository. The instructions, when executed, may cause the computing platform to transmit, by the proxy server and to the user, a notification indicating denial of the request to access the webpage.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which:

FIGS. 2A-2F depict an illustrative event sequence for preventing data loss using enhanced analysis of the URLs and URIs in webpage requests, in accordance with one or more example embodiments.

DETAILED DESCRIPTION

Figure 1A:
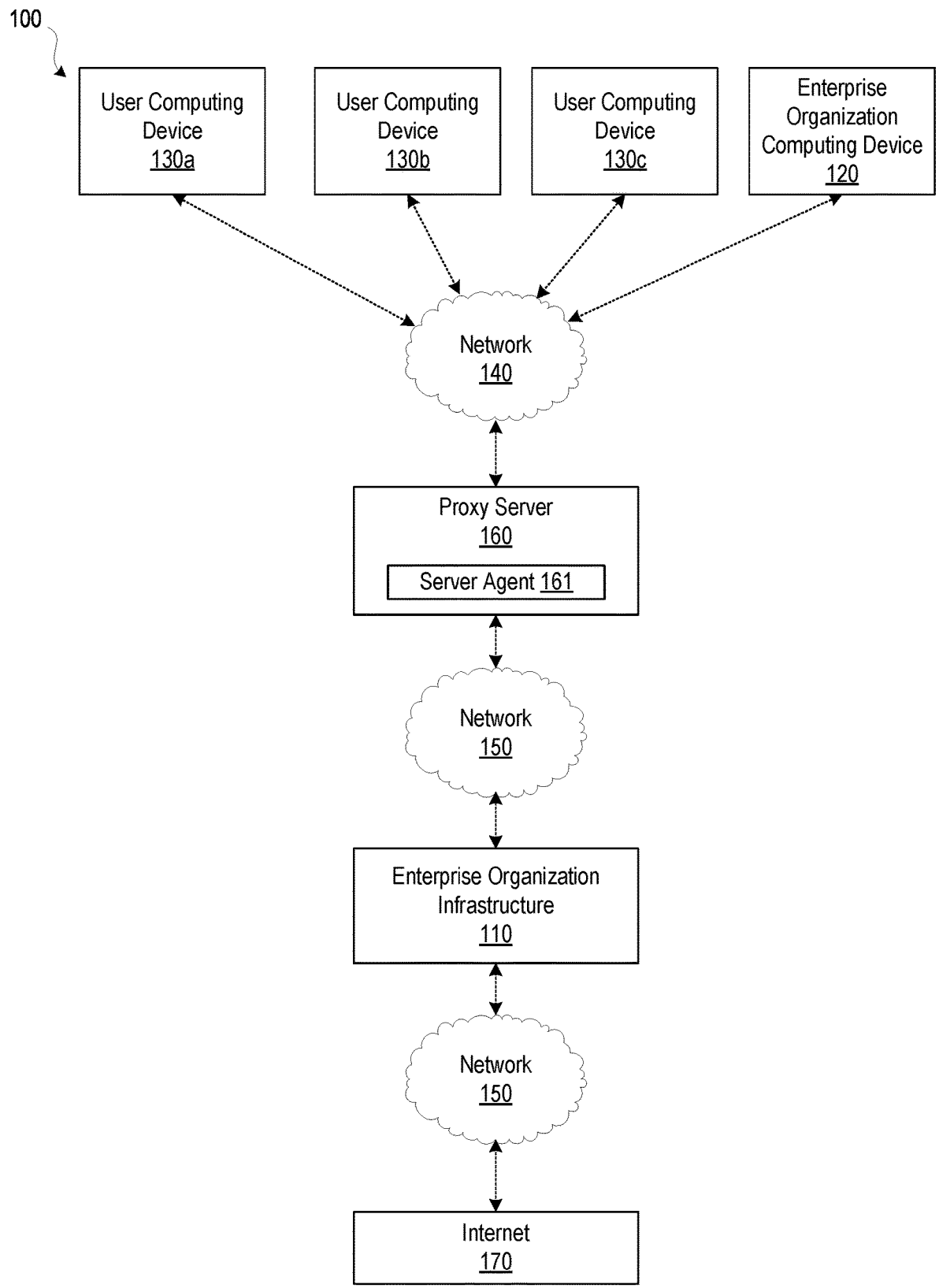
FIG. 1A depicts an illustrative example of a computing environment for preventing data loss using enhanced analysis of the URLs and URIs in webpage requests, in accordance with one or more example embodiments.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As discussed above, current data loss prevention protocols fail to detect re-written URIs, to consider the consequences of permitting users to access webpages associated with re-written URIs, and to protect sensitive enterprise organization data from the webpages or content associated with re-written URIs. Accordingly, proposed herein is a solution to the problem described above that includes preventing data loss using enhanced analysis of the URLs and URIs in webpage requests. A user may transmit, using a user computing device, a webpage request to a proxy server associated with an enterprise organization. The proxy server may determine whether the user regularly accesses the requested webpage (e.g., while performing duties within the enterprise organization). If the proxy server determines that the user regularly access the requested webpage, then the proxy server may permit the user the access the requested webpage. Alternatively, if the proxy server determines that the user does not regularly access the requested webpage, then the proxy server may determine whether enterprise organization guidelines permit the user to access the requested webpage. If the proxy server determines the enterprise organization guidelines restrict access to the requested webpage, then the proxy server may transmit a notification to the user indicating denial of the webpage request. Alternatively, if the proxy server determines the enterprise organization guidelines permit access to the requested webpage, then the proxy server may transmit instructions to the user computing device to engage an artificial intelligence (AI) engine to further analyze the webpage request.

The AI engine may parse the webpage request to identify a URL and a URI that correspond to the requested webpage. The AI engine may use the URL and the URI to access the requested webpage as well as source code that corresponds to the requested webpage. The AI engine may parse the source code to identify header data that describes the data on the requested webpage. The AI engine may determine whether the header data corresponds to the URL. If the AI engine determines that the header data does not correspond with the URL, then the AI engine may flag the requested webpage (e.g., as malicious or potentially malicious) and may transmit a notification to the user indicating denial of the webpage request. Alternatively, if the AI engine determines the header data corresponds with the URL, then the AI engine may instruct the proxy server to retrieve the requested webpage and to present the requested webpage to the user.

The AI engine may monitor the user's interaction with the requested webpage to determine whether the user's interaction corresponds to (e.g., is similar to, matches) the expected interaction with the requested webpage. If the AI engine determines that the user's interaction with the requested webpage is similar to the expected interaction, then the AI engine may continue monitoring the user's interaction until the user terminates access to the requested webpage. Alternatively, if the AI engine determines that the user's interaction does not correspond to (e.g., is different from) the expected interaction, then the AI engine may instruct the proxy server to terminate access to the requested webpage. The AI engine may transmit a notification to the user indicating denial of access to the requested webpage.

Computer Architecture

FIG. 1A depicts an illustrative example of a computing environment 100 for preventing data loss using enhanced analysis of the URLs and URIs in webpage requests, in accordance with the features described herein. Computing environment 100 may comprise enterprise organization infrastructure 110, enterprise organization computing device 120, user computing devices 130a-130c, network 140, network 150, proxy server 160, and internet 170. While FIG. 1A depicts more than one user computing device (e.g. user computing devices 130a-130c), each of user computing devices 130a-130c may be configured in accordance with the features described herein. While the description herein may refer to user computing device 130, it is important to note that the functions described in connection with user computing device 130 may also be performed by any one of user computing devices 130a-130c. Each one of user computing devices 130a-130c and enterprise organization computing device 120 may be configured to communicate with proxy server 160 through network 140. Proxy server 160 may be configured to communicate with enterprise organization infrastructure 110 through network 150. Enterprise organization infrastructure 110 may be configured to communicate with internet 170 through network 150. In some arrangements, computing environment 100 may include additional computing devices that are not depicted in FIG. 1A, which may also be configured to interact with enterprise organization infrastructure 110 and proxy server 160.

As discussed in detail in connection with FIG. 1B, enterprise organization infrastructure 110 may comprise accessibility repository 111, user baseline database 112, database 113, and processor(s) 114. Each computing device within enterprise organization infrastructure 110 may contain database 113 and processor(s) 114, which may be stored in the memory of the one or more computing device(s) of enterprise organization infrastructure 110. Enterprise organization infrastructure 110 may be associated with a distinct entity such as an enterprise organization, financial institution, company, school, government, or the like, and may comprise one or more personal computer(s), server computer(s), hand-held or laptop device(s), multiprocessor system(s), microprocessor-based system(s), set top box(es), programmable client electronic device(s), network personal computer(s) (PC), minicomputer(s), mainframe computer(s), distributed computing environment(s), or the like. Enterprise organization infrastructure 110 may include computing hardware and/or software that may host various data and applications for performing tasks of the centralized entity and interacting with user computing device 130, as well as other computing devices.

In some arrangements, enterprise organization infrastructure 110 may include and/or be part of enterprise information technology infrastructure and may host a plurality of enterprise applications, enterprise databases, and/or other enterprise resources. Such applications may be executed on one or more computing devices included in enterprise organization infrastructure 110 using distributed computing technology or the like. In some instances, enterprise organization infrastructure 110 may include a relatively large number of servers that may support operations of the enterprise organization.

As discussed in detail in connection with FIG. 1C, enterprise organization computing device 120 may comprise network interface 121, webpage request application programming interface (API) 124, communication interface(s) 125, processor(s) 126, and memory(s) 127. Network interface 121 may comprise user interface 122 and enterprise organization agent 123. Enterprise organization computing device 120 may be configured to communicate with, and receive communication from, proxy server 160 across network 140.

As discussed in detail in connection with FIG. 1D, user computing device 130 may comprise network interface 131, AI engine 134, webpage request API 135, communication interface(s) 136, processor(s) 137, and memory(s) 138. Network interface 131 may comprise user interface 132 and user agent 133. User computing device 130 may be configured to communicate with, and receive communication from, proxy server 160 across network 140.

Figure 1B:
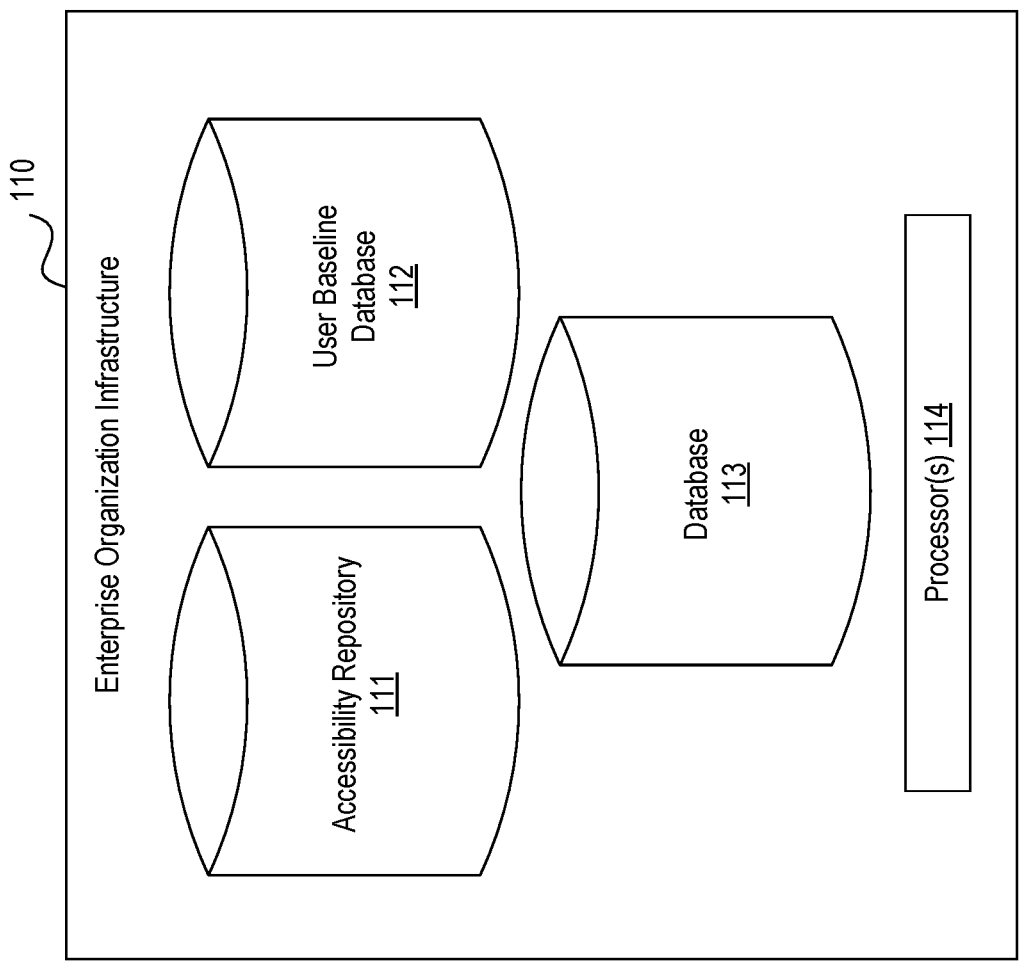
FIG. 1B depicts an illustrative example of the enterprise infrastructure for preventing data loss using enhanced analysis of the URLs and URIs in webpage requests, in accordance with one or more example embodiments.

FIG. 1B depicts an illustrative example of the enterprise infrastructure for preventing data loss using enhanced analysis of the URLs and URIs in webpage requests, in accordance with the features described herein. Enterprise organization infrastructure may comprise accessibility repository 111, user baseline database 112, database 113, and processor(s) 114. One or more program units having instructions that, when executed by processor(s) 114, may cause enterprise organization infrastructure 110 to perform one or more functions described herein and/or may cause one or more databases (e.g., accessibility repository 111, user baseline database 112, database 113, or the like) to store and/or otherwise maintain information which may be used by such program units and/or processor(s) 114.

Accessibility repository 111 may store a plurality of webpages, wherein each stored webpage is associated with an accessibility indicator. The accessibility indicator associated with a webpage may indicate whether a user is permitted to access the webpage (e.g., based on enterprise organization guidelines). For example, if a user is not permitted to access a particular webpage, then the accessibility indicator may flag the webpage as "inaccessible." Alternatively, if the user is permitted to access the particular webpage, then the accessibility indicator may flag the webpage as "accessible." The webpages flagged as "inaccessible" may be stored separately from the webpages flagged as "accessible." For example, the "inaccessible"

webpages may be used to populate a first list of webpages (e.g., a deny list), wherein the deny list may indicate webpages that the user is not permitted to access. The "accessible" webpages may be used to populate a second list of webpages (e.g., an allow list), wherein the allow list may indicate webpages that the user is permitted to access.

The webpages stored in accessibility repository 111 may derive from webpage requests that were analyzed using the methods and features described herein. For example, if AI engine 134 determines that the webpage in a user webpage request features malicious, or potentially malicious, data that may jeopardize sensitive enterprise organization data, then AI engine 134 may flag the requested webpage as "inaccessible," and the webpage may be stored on the deny list. Alternatively, if AI engine 134 determines that the webpage in the user webpage request does not feature malicious, or potentially malicious, data, then AI engine 134 may flag the requested webpage as "accessible," and the webpage may be stored on the allow list.

Accessibility repository 111 may further store webpages identified by the enterprise organization (e.g., enterprise organization computing device 120) using enterprise organization guidelines. The enterprise organization guidelines may identify criteria that the enterprise organization may use to determine whether a webpage should be stored on the allow list or the deny list. To determine whether a webpage should be stored on the allow list, the enterprise organization may consider whether the webpage is instrumental to a user's role within the enterprise organization (e.g., a manager of a programming team may be need to access programming techniques discussed in various online forums), whether the webpage is regularly used by a particular team within the enterprise organization (e.g., a data retention team may need to access, and investigate, methods of gaining access to sensitive information to better protect against such attacks), whether the concept associated with the webpage is relevant to the enterprise organization's industry (e.g., a financial institution may be interested in allowing users to access personal financial data), or the like. To determine whether webpages should be stored on the deny list, the enterprise organization may crawl the internet to identify webpages that may contain malicious, or potentially malicious, data that may jeopardize sensitive enterprise organization data.

Access to accessibility repository 111 may differ depending on the computing device requesting access (e.g., a hierarchy of accessibility). Enterprise organization computing device 120 and AI engine 134 may be associated with a first level of accessibility (e.g., a least restrictive level of accessibility). Both of enterprise organization computing device 120 and AI engine 134 may perform functions on the data within accessibility repository 111 (e.g., access the allow list and the deny list, add new webpages, remove webpages, modify the allow list and the deny list, or the like). Proxy server 160 may be associated with a second level of accessibility (e.g., a more restrictive level of accessibility than the first level of accessibility). Proxy server 160 may view the webpages within accessibility repository 111, but might not be permitted to add, remove, or modify either one of the allow list or the deny list within accessibility repository 111.

User baseline database 112 may store, for each user, a plurality of webpages associated with the user. The webpages associated with the user may represent the webpages that the user regularly accesses. For example, if a user accesses a personal finance webpage daily, then the personal finance webpage may be stored in the portion of user baseline database 112 dedicated to the user. The data stored in user baseline database 112 may correspond to credentials associated with each user (e.g., login credentials, enterprise organization clearance credentials, or the like) such that the data within user baseline database 112 may be updated even if the user submits a webpage or content request using a different computing device than the user may regularly use.

Access to user baseline database 112 may differ depending on the computing device requesting access (e.g., a hierarchy of accessibility). AI engine 134 may be associated with a first level of accessibility (e.g., a least restrictive level of accessibility). AI engine 134 may perform functions on the data within user baseline database 112 (e.g., access the data associated with each user, add new webpages, remove webpages, modify each user's data, or the like). Proxy server 160 may be associated with a second level of accessibility (e.g., a more restrictive level of accessibility than the first level of accessibility). Proxy server 160 may view the webpages associated with each user within user baseline database 112, but might not be permitted to add, remove, or modify the data within user baseline database 112.

Figure 1C:
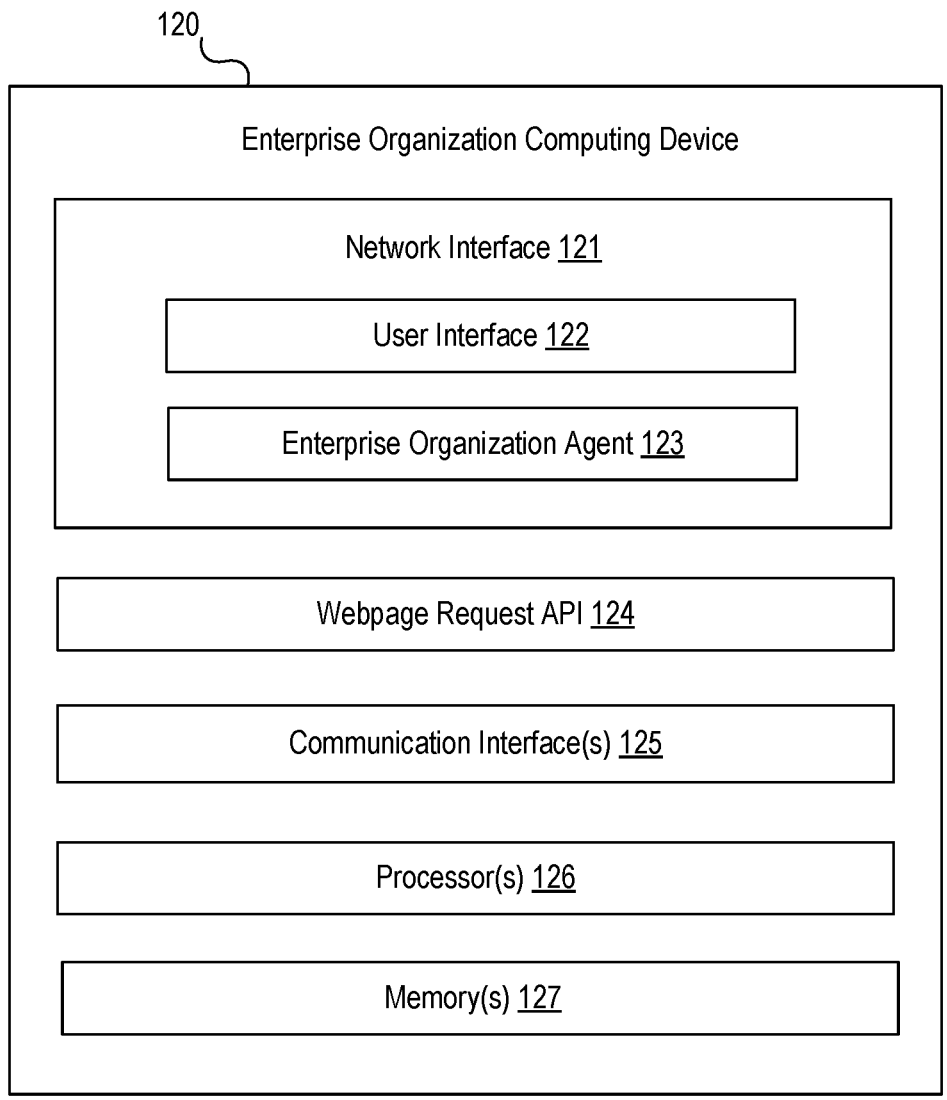
FIG. 1C depicts an illustrative example of the enterprise organization computing device for preventing data loss using enhanced analysis of the URLs and URIs in webpage requests, in accordance with one or more example embodiments.

FIG. 1C depicts an example of the enterprise organization computing device for preventing data loss using enhanced analysis of the URLs and URIs in webpage requests, in accordance with the features described herein. Enterprise organization computing device 120 may comprise network interface 121, webpage request API 124, communication interface(s) 125, processor(s) 126, and memory(s) 127, all of which may be interconnected using a data bus processor. Memory(s) 127 may include one or more program units having instructions that, when executed by processor(s) 126, may cause enterprise organization computing device 120 to perform one or more functions described herein and/or may cause one or more databases to store and/or otherwise maintain information which may be used by such program units and/or processor(s) 126.

In some instances, enterprise organization computing device 120 may use network interface 121 to communicate with proxy server 160 (e.g., to transmit webpage requests) across network 140. Enterprise organization computing device 120 may use enterprise organization agent 123 to communicate with server agent 161 of proxy server 160. Enterprise organization computing device 120 may, using communication interface(s) 125 (e.g., peripheral devices, such as a mouse, a keyboard, or the like), input a webpage request and may transmit the webpage request to server agent 161 using enterprise organization agent 123. The webpage request may be displayed to the user through user interface 122. Enterprise organization agent 123 may receive communication from server agent 161 of proxy server 160 (e.g., a notification indicating denial of the webpage request), which may be displayed to the user through user interface 122.

In some instances, enterprise organization computing device 120 may use webpage request API 124 to request a webpage. Enterprise organization computing device 120 may launch a web browser and may transmit a blank file (e.g., a blank hypertext markup language (HTML) file). Enterprise organization computing device 120 may launch (or draft) webpage request API 124, using communication interface(s) 125, to transmit the webpage request. In doing so, enterprise organization computing device 120 may use webpage request API 124 to identify the location of the requested webpage (e.g., the URL associated with the requested webpage, the internet protocol (IP) of the requested webpage, or the like). While a user may generate and transmit webpage requests using a plurality of methods (e.g., communicating with a proxy server, through an API, or the like), the method and examples discussed herein illustrate communications between a user computing device (e.g., user computing device 130) and a proxy server (e.g., proxy server 160). The method and examples discussed herein are not intended to be limiting, but serve as a sample implementation for illustration purposes.

Enterprise organization computing device 120 may populate accessibility repository 111. To do so, enterprise organization computing device 120 may generate the enterprise organization guidelines, which identify criteria that the enterprise organization may use to determine whether a webpage should be stored on the allow list or the deny list. As discussed above, the webpages stored on the allow list are webpages that the user may be permitted to access, whereas the webpages stored on the deny list are webpages that the user might not be permitted to access. Enterprise organization computing device 120 may consider factors that contribute to the legitimacy of the webpage request. For example, enterprise organization computing device 120 may consider a rank (e.g., executive title) associated with the user who generated the webpage request, whether the user is affiliated with a particular project within the enterprise organization which may require access to the requested webpage, or the like. Enterprise organization computing device 120 may transmit the allow list webpages and the deny list webpages to accessibility repository 111 using network 150.

Enterprise organization computing device 120 may further populate accessibility repository 111 by crawling the internet to identify webpages that may contain malicious, or potentially malicious, data that may jeopardize sensitive enterprise organization data. To do so, enterprise organization computing device 120 may establish a secure internet connection across network 150 and using network interface 121. Enterprise organization computing device 120 may launch a web browser, using communication interface(s) 125 and user interface 122, and may use the web browser to access webpages that the enterprise organization may know contain malicious, or potentially malicious, data. Enterprise organization computing device 120 may analyze meta data associated with the webpages to determine whether the webpages are hosted on additional web servers. Enterprise organization computing device 120 may identify the additional web servers and may explore additional webpages that may hosted on the additional web servers. Enterprise organization computing device 120 may determine whether the additional webpages contain malicious, or potentially malicious, data and may visit the additional webpages hosted by the additional web servers. Enterprise organization computing device 120 may continuously identify additional web servers and continuously visit additional webpages hosted by the additional web servers. If enterprise organization computing device 120 determines that a webpage contains malicious, or potentially malicious, data that may jeopardize sensitive enterprise organization data, then enterprise organization computing device 120 may flag the webpage as "inaccessible" in accessibility repository 111 and may store the webpage on the deny list. Alternatively, if enterprise organization computing device 120 determines that the webpage does not contain malicious, or potentially malicious, data, then enterprise organization computing device 120 may flag the webpage as "accessible" in accessibility repository 111 and may store the webpage on the allow list.

Figure 1D:
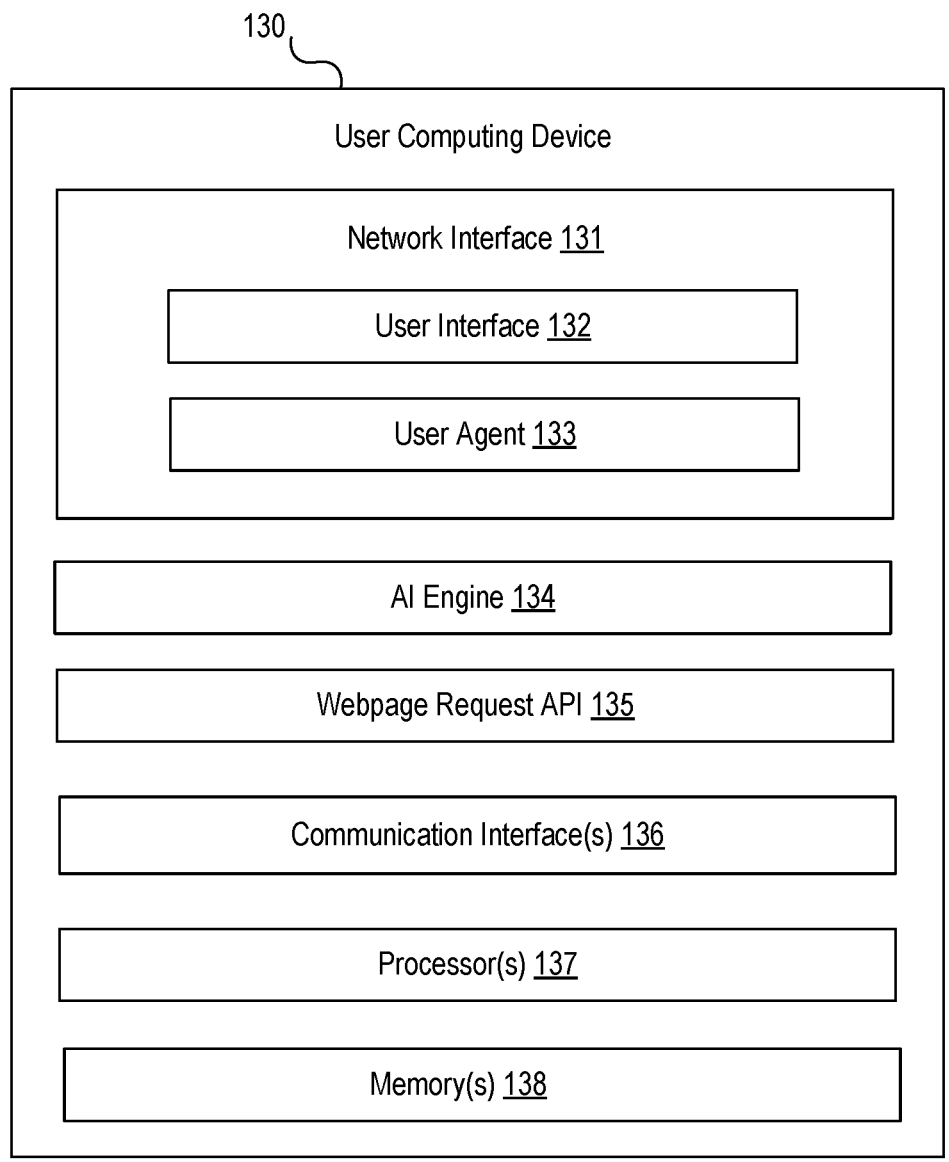
FIG. 1D depicts an illustrative example of the user computing device for preventing data loss using enhanced analysis of the URLs and URIs in webpage requests, in accordance with one or more example embodiments.

FIG. 1D depicts an example of the user computing device for preventing data loss using enhanced analysis of the URLs and URIs in webpage requests, in accordance with the features described herein. User computing device 130 may comprise network interface 131, AI engine 134, webpage request API 135, communication interface(s) 136, processor(s) 137, and memory(s) 138, all of which may be interconnected using a data bus processor. Memory(s) 138 may include one or more program units having instructions that, when executed by processor(s) 137, may cause user computing device 130 to perform one or more functions described herein and/or may cause one or more databases to store and/or otherwise maintain information which may be used by such program units and/or processor(s) 137. Network interface 131 may comprise user interface 132 and user agent 133.

User computing device 130 may be configured to generate and transmit webpage requests. In some instances, user computing device 130 may use network interface 131 to communicate with proxy server 160 (e.g., to transmit webpage requests) across network 140. User computing device 130 may use user agent 133 to communicate with server agent 161 of proxy server 160. User computing device 130 may, using communication interface(s) 136 (e.g., peripheral devices, such as a mouse, a keyboard, or the like), input a webpage request and may transmit the webpage request to server agent 161 using user agent 133. The webpage request may be displayed to the user through user interface 132. User agent 133 may receive communication from server agent 161 of proxy server 160 (e.g., a notification indicating termination of webpage transmission), which may be displayed to the user through user interface 132.

In some instances, user computing device 130 may use webpage request API 135 to request access to a webpage. User computing device 130 may launch a web browser and may transmit a blank file (e.g., a blank HTML file) using communication interface(s) 136 and user interface 132. User computing device 130 may launch (or draft) webpage request API 135, using communication interface(s) 136, to transmit the webpage request. In doing so, user computing device 130 may use webpage request API 135 to identify the location of the requested webpage (e.g., the URL associated with the requested webpage, the IP of the requested webpage, or the like). While a user may generate and transmit webpage requests using a plurality of methods (e.g., communicating with a proxy server, through an API, or the like), the method and examples discussed herein illustrate communications between user computing device 130 and proxy server 160. The method and examples discussed herein are not intended to be limiting, but serve as a sample implementation for illustration purposes.

User computing device 130 may transmit the webpage request to proxy server 160 (or using webpage request API 135) using network 140. Proxy server 160 may comprise server agent 161. Server agent 161 may be configured to communicate with at least one of enterprise organization computing device 120 (e.g., through enterprise organization agent 123) or user computing device 130 (e.g., through user agent 133). Proxy server 160 may be associated with an enterprise organization (e.g., a financial institution). The enterprise organization may use proxy server 160 to manage and centralize the number of internet connections that are associated with the enterprise organization. For example, the enterprise organization may instruct computing devices (e.g., enterprise organization computing device 120, user computing device 130) to transmit webpage requests to proxy server 160, as opposed to internet 170, such that the webpage requests may be processed using a controlled internet connection. Internet 170 may comprise a network of computing devices and web servers, wherein each computing device within the network may request and retrieve information from other computing devices. Proxy server 160 may transmit webpage requests to internet 170, wherein internet 170 may communicate with additional computing devices to retrieve the requested webpage and to transmit the requested webpage to proxy server 160.

Proxy server 160 may receive webpage requests, from any one of user computing device 130 or enterprise organization computing device 120, through server agent 161. Proxy server 160 may receive the webpage requests across network 140. Network 140 may be one of a private network or a public network, and may include one or more sub-networks (e.g., local area networks (LANs), wide area networks (WANs), or the like).

Proxy server 160 may communicate with enterprise organization infrastructure 110 across network 150. Network 150 may be one of a private network or a public network, and may include one or more sub-networks (e.g., local area networks (LANs), wide area networks (WANs), or the like). Proxy server 160 may access accessibility repository 111 and user baseline database 112 within enterprise organization infrastructure 110. Proxy server 160 may access user baseline database 112 and may determine whether the user regularly accesses the webpage featured in the webpage request. If proxy server 160 determines the user regularly accesses the webpage featured in the webpage request, then proxy server 160 may grant the webpage request. In particular, proxy server 160 may instruct internet 170 to locate the address (e.g., IP address) associated with the requested webpage, retrieve the requested webpage, and transmit the requested webpage to proxy server 160 across network 150. Proxy server 160 may receive the webpage transmission from internet 170 across network 150. Proxy server 160 may transmit the requested webpage to user computing device 130 across network 140.

Alternatively, if proxy server 160 determines that the user does not regularly access the webpage featured in the webpage request, then proxy server 160 may access accessibility repository 111 to determine whether the user is permitted to access the requested webpage. If proxy server 160 determines that the user is not permitted to access the requested webpage (e.g., if the requested webpage is flagged as "inaccessible" in accessibility repository 111), then proxy server 160 may transmit a notification to user computing device 130 indicating denial of the webpage request. Alternatively, if proxy server 160 determines that the user is permitted to access the requested webpage (e.g., if the requested webpage is flagged as "accessible" in accessibility repository 111), the proxy server 160 may transmit instructions to user computing device 130 to launch AI engine 134. In some instances, proxy server 160 may determine that the webpage featured in the webpage request might not be stored in accessibility repository 111 (e.g., the user might not have previously transmitted a request to access the webpage, the enterprise organization might not have visited the webpage while crawling the internet, or the like). In such instances, proxy server 160 may proceed with the enhanced URL and URI analysis described herein.

Proxy server 160 may receive, from AI engine 134, a notification indicating that the webpage featured in the webpage request may contain malicious, or potentially malicious, data that may jeopardize sensitive enterprise organization data. In such instances, proxy server 160 may transmit, to user computing device 130, a notification indicating denial of the webpage request. Alternatively, proxy server 160 may receive, from AI engine 134, a notification indicating that the webpage featured in the webpage request might not contain malicious, or potentially malicious, data. Proxy server 160 may receive instructions, from AI engine 134, to grant the webpage request. In such instances, proxy server 160 may establish a connection with internet 170. Proxy server 160 may transmit, to internet 170, a request for internet 170 to locate the address (e.g., IP address) associated with the requested webpage, retrieve the requested webpage, and transmit the requested webpage to proxy server 160 across network 150. Proxy server 160 may receive, from internet 170, the requested webpage and may transmit the requested webpage to user computing device 130.

Proxy server 160 may receive, from AI engine 134, a notification indicating the interaction between user computing device 130 and the requested webpage might not correspond to an expected interaction (e.g., the requested webpage may display a single image, but the interaction between user computing device 130 and the requested webpage may indicate that user computing device 130 is downloading a plurality of large files). In such instances, proxy server 160 may receive, from AI engine 134, instructions to terminate the transmission of the requested webpage. Proxy server 160 may transmit instructions to internet 170 to terminate the transmission of the requested webpage. Proxy server 160 may transmit a notification to user computing device 130 indicating termination of webpage access.

As introduced above, user computing device 130 may further comprise AI engine 134. AI engine 134 may parse the webpage request, generated by user computing device 130, to identify a URL and URI that correspond to the webpage featured in the webpage request. AI engine 134 may use the identified URL and URI to access and analyze the requested webpage. In particular, AI engine 134 may access source code associated with the requested webpage. AI engine 134 may parse the source code to identify data displayed on the requested webpage (e.g., header data, data that is accessible via the requested webpage, embedded hyperlinks, embedded files, or the like). AI engine 134 may compare the source code (e.g., header data) to the URL that corresponds to the requested webpage. AI engine 134 may determine whether the header data corresponds to the URL. For example, if the URL indicates the requested webpage is a gardening webpage, but the header data indicates the requested webpage displays information related to accessing enterprise organization data, then AI engine 134 may determine that the header data does not correspond to the URL.

In such instances, AI engine 134 may determine the URI associated with the requested webpage may have been re-written (e.g., using embedded features associated with scripting languages). A URI that may have been re-written may suggest that a description of the requested webpage in the URI might not correspond to (e.g., may be different from) the data that is featured on the requested webpage. Taking the previous example, a URL may suggest that the requested webpage displays information pertaining to gardening and a corresponding URI may suggest that the requested webpage displays information specific to gardening in tropical climates. However, the header data associated with the gardening webpage may reveal that the gardening webpage fails to display gardening information, but instead may display methods for accessing enterprise organization data. In such instances, AI engine 134 may determine that the URI may have been re-written in an attempt to access malicious, or potentially malicious, data that may jeopardize sensitive enterprise organization data.

If AI engine 134 determines that the header data does not correspond to the URL (e.g., that the URI may have been re-written), then AI engine 134 may flag the requested webpage (e.g., indicate that the requested webpage contains malicious, or potentially malicious, data). AI engine 134 may transmit a notification to proxy server 160 indicating that the requested webpage was flagged for containing malicious, or potentially malicious, data that may jeopardize sensitive enterprise organization data. In such instances AI engine 134 may store the requested webpage in accessibility repository 111 (e.g., on the deny list within accessibility repository 111).

Alternatively, if AI engine 134 determines that the header data corresponds to the URL (e.g., that the URI might not have been re-written), then AI engine 134 may transmit a notification to proxy server 160 indicating that the requested webpage might not contain malicious, or potentially malicious, data that may jeopardize sensitive enterprise organization data. AI engine 134 may instruct proxy server 160 to transmit the requested webpage to user computing device 130. In such instances, AI engine 134 may store the requested webpage in accessibility repository 111 (e.g., on the allow list within accessibility repository 111) and in user baseline database 112.

AI engine 134 may continuously monitor the interaction between user computing device 130 and the requested webpage. If AI engine 134 determines that the interaction between user computing device 130 and the requested webpage is different from an expected interaction, then AI engine 134 may instruct proxy server 160 to terminate transmission of the requested webpage to user computing device 130. For example, header data, a URL, and a URI may suggest that the requested webpage displays gardening information and that the requested webpage might not contain embedded files or embedded hyperlinks (e.g., the requested webpage might not contain information available for download, the requested webpage might not offer data other than what is displayed, or the like). As such, based on the header data, the URL, and the URI, user computing device 130 may be expected to view the data displayed on the requested webpage, but the interaction between user computing device 130 and the requested webpage indicates that user computing device 130 is able to download data files from the requested webpage. In such instances, AI engine 134 may flag the interaction and may instruct proxy server 160 to cease transmission of the requested webpage.

Alternatively, if AI engine 134 determines that the interaction between user computing device 130 and the requested webpage is similar to the expected interaction, then AI engine 134 may continue to monitor the interaction (e.g., until user computing device 130 terminates access to the requested webpage). Taking the previous example, the header data, the URL, and the URI may suggest that the requested webpage displays gardening information and that the requested webpage might not contain embedded files or embedded hyperlinks. As such, based on the header data, the URL, and the URI, user computing device 130 may be expected to view the data displayed on the requested webpage. AI engine 134 may determine that the interaction between user computing device 130 and the gardening webpage corresponds to the expected interaction (e.g., user computing device 130 views the gardening data, but does not download any data files). In such instances, AI engine 134 may continue monitoring the interaction between user computing device 130 and the requested webpage to determine whether the interaction deviates from the expected interaction.

Preventing Data Loss Using Enhanced Analysis of the URLs and URIs in Webpage Requests FIGS. 2A-2F depict an illustrative event sequence for preventing data loss using enhanced analysis of the URLs and URIs in webpage requests, in accordance with one or more aspects described herein. While aspects described with respect to FIG. 2A to FIG. 3B include the analysis of a single webpage request, a plurality of webpage requests may be received and analyzed (e.g., in parallel) without departing from the present disclosure. Further, one or more aspects described herein may be performed in real-time or near real-time.

Figure 2A:
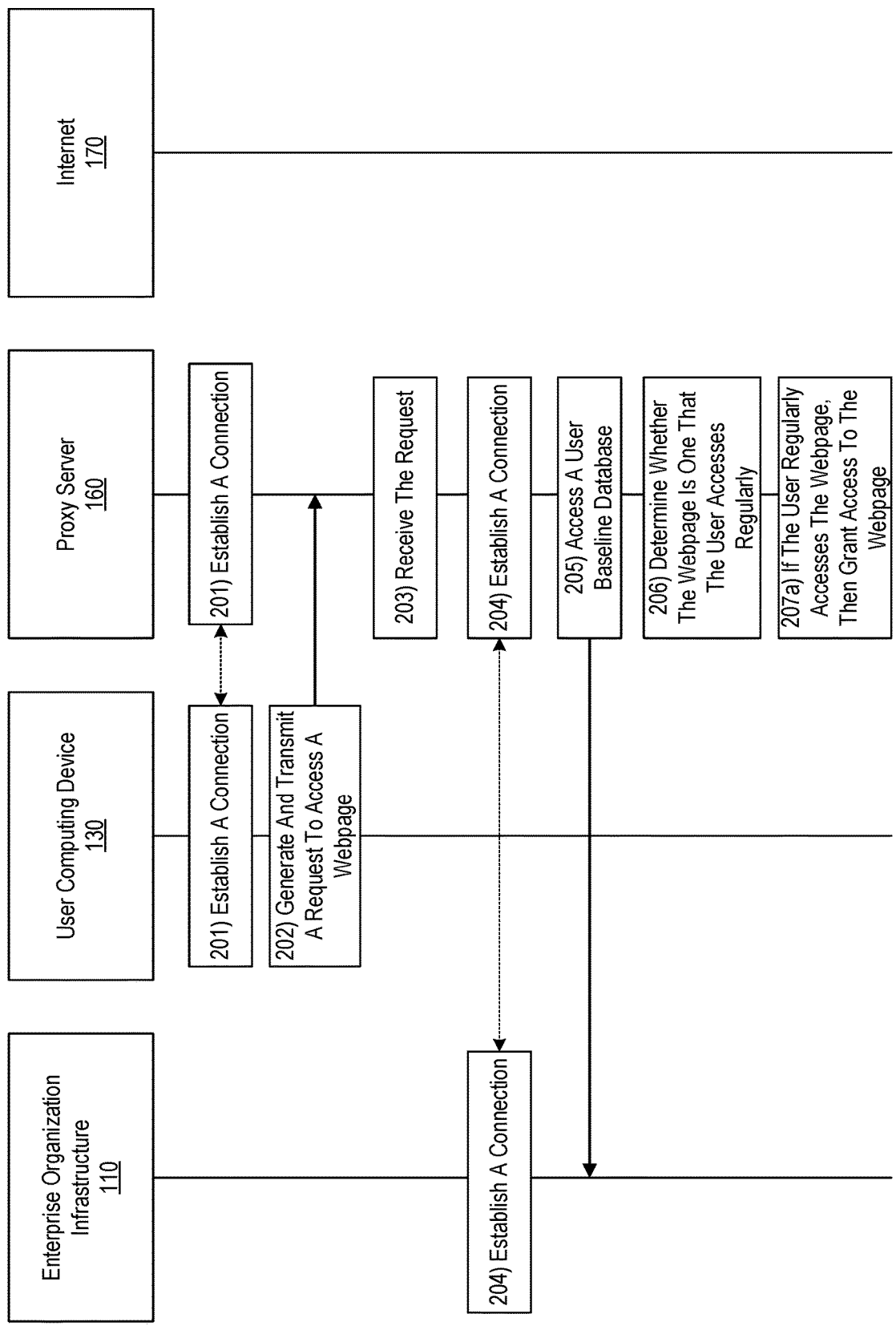

Referring to FIG. 2A, at step 201, user computing device 130 may establish a network connection with proxy server 160. As described in detail below, user computing device 130 and proxy server 160 may communicate (e.g., transmit webpage requests, receive webpage transmissions, or the like) via network 140.

At step 202, user computing device 130 may generate and transmit, to proxy server 160 via network 140, a webpage request. User computing device 130 may, using communication interface(s) 136 (e.g., peripheral devices, such as a mouse, a keyboard, or the like), launch a web browser and may input a URL and a URI that may be used to locate the requested webpage (e.g., may be used to retrieve the IP address associated with the requested webpage) and to retrieve the requested webpage from its host web server. User computing device 130 may, using user agent 133 of network interface 131, transmit the webpage request to server agent 161 of proxy server 160.

At step 203, proxy server 160 may receive the webpage request from user computing device 130 via network 140. At step 204, proxy server 160 may establish a connection with enterprise organization infrastructure 110. Proxy server 160 may communicate with enterprise organization infrastructure 110 via network 150.

At step 205, proxy server 160 may access user baseline database 112 within enterprise organization infrastructure 110. User baseline database 112 may store, for each user computing device 130 or user associated therewith, a plurality of webpages associated with user computing device 130 or user associated therewith. The webpages associated with user computing device 130 may represent the webpages that user computing device 130, or user associated therewith, regularly accesses. For example, if user computing device 130 accesses a programming languages forum daily, then the forum webpage may be stored in the portion of user baseline database 112 dedicated to user computing device 130 or a user associated therewith.

At step 206, proxy server 160 may determine whether user computing device 130 regularly accesses (e.g., daily, weekly, bi-weekly, or the like) the webpage featured in the webpage request. To do so, proxy server 160 may locate the portion of user baseline database 112 that indicates the webpages that user computing device 130 or a user associated therewith may access frequently (e.g., at least a predetermined threshold number of times in a predetermined time period). Proxy server 160 may determine whether the webpage featured in the webpage request is also featured in the portion of user baseline database 112 that is associated with user computing device 130.

If, at step 206, proxy server 160 determines user computing device 130 regularly accesses the webpage featured in the webpage request, then, at step 207*a*, proxy server 160 may grant the webpage request. In particular, proxy server 160 may instruct internet 170 to locate the address (e.g., IP address) associated with the requested webpage, retrieve the requested webpage from its host web server, and transmit the requested webpage to proxy server 160 via network 150. Proxy server 160 may receive the webpage transmission from internet 170 via network 150 and may transmit the requested webpage to user computing device 130 via network 140.

Figure 2B:
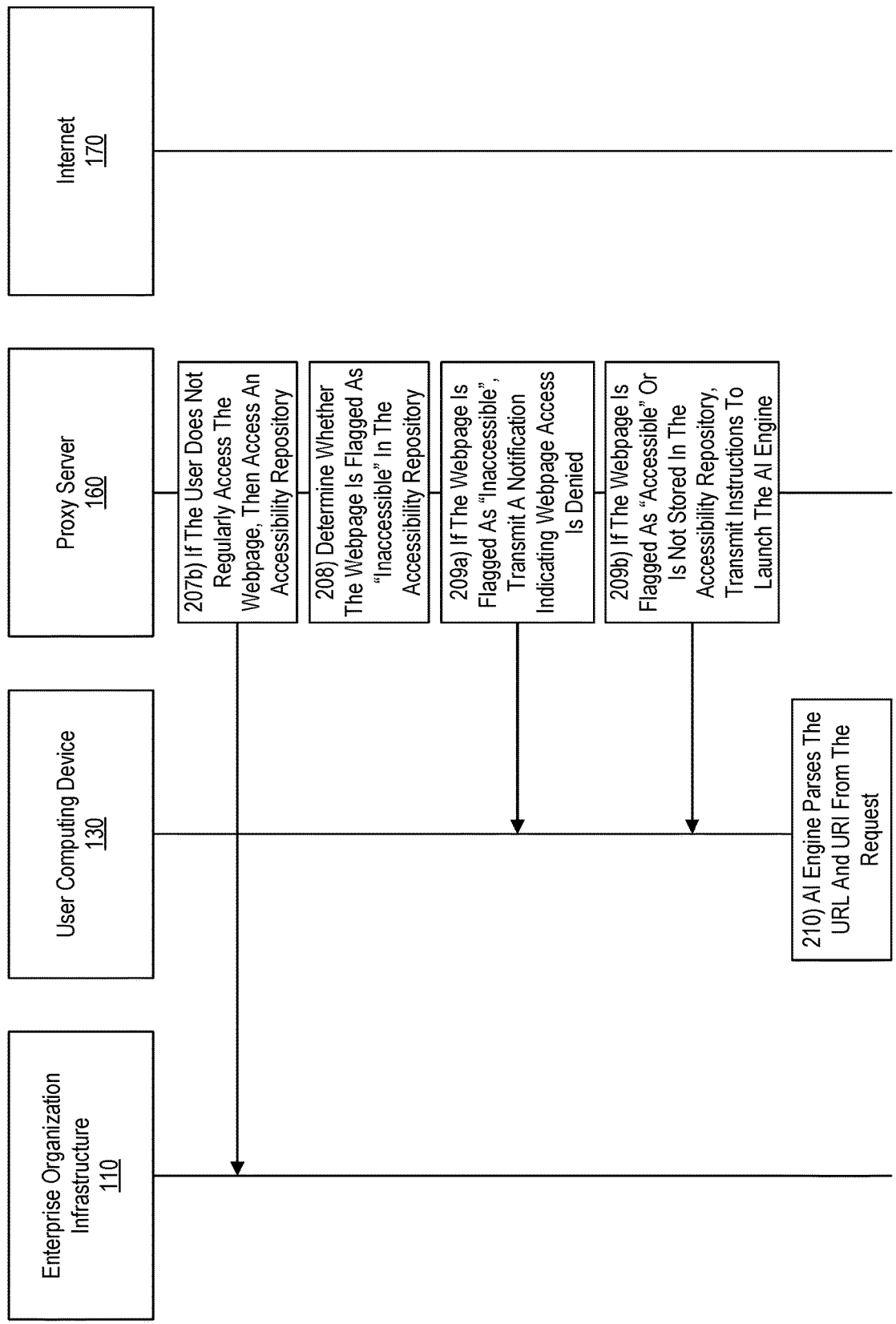

Alternatively, if, at step 206, proxy server 160 determines that user computing device 130 might not regularly access the webpage featured in the webpage request, then, referring to FIG. 2B and at step 207b, proxy server 160 may access accessibility repository 111 of enterprise organization infrastructure 110. Accessibility repository 111 may store a plurality of webpages, wherein each stored webpage may be associated with an accessibility indicator. The accessibility indicator associated with a webpage may indicate whether user computing device 130 is permitted to access the webpage (e.g., based on enterprise organization guidelines). For example, if user computing device 130 is not permitted to access a particular webpage, then the accessibility indicator may flag the webpage as "inaccessible." Alternatively, if user computing device 130 is permitted to access the particular webpage, then the accessibility indicator may flag the webpage as "accessible." The webpages flagged as "inaccessible" may be stored separately from the webpages flagged as "accessible." For example, the "inaccessible" webpages may be used to populate a first list of webpages (e.g., a deny list), wherein the deny list may indicate webpages that the user is not permitted to access. The "accessible" webpages may be used to populate a second list of webpages (e.g., an allow list), wherein the allow list may indicate webpages that the user is permitted to access.

At step 208, proxy server 160 may determine whether user computing device 130 is permitted to access the requested webpage (e.g., whether the requested webpage is flagged as "inaccessible"). In particular, proxy server 160 may determine whether the webpage featured in the webpage request is stored in accessibility repository 111 and whether the webpage featured in the webpage request is associated with an accessibility indicator. If the webpage featured in the webpage request is stored in accessibility repository 111, proxy server 160 may read the accessibility indicator associated with the requested webpage. However, if the webpage featured in the webpage request is not stored in accessibility repository 111 (e.g., user computing device 130 might not have previously transmitted a request to access the webpage, enterprise organization computing device 120 might not have visited the webpage while crawling the internet, or the like), proxy server 160 may proceed with the enhanced URL and URI analysis described herein.

If, at step 208, proxy server 160 determines the webpage featured in the webpage request is stored in accessibility repository 111 and is flagged as "inaccessible," then, at step 209a, proxy server 160 may transmit a notification to user computing device 130 indicating denial of the webpage request. In particular, server agent 161 may communicate with user agent 133 and user interface 132 may display the notification on user computing device 130.

Alternatively, if, at step 208, proxy server 160 determines the webpage featured in the webpage request is either not stored in accessibility repository 111, or is stored in accessibility repository and is flagged as "accessible," then, at step 209b, proxy server 160 may transmit instructions to user computing device 130 to launch AI engine 134. As described below, AI engine 134 may examine the webpage request generated by user computing device 130 to identify a URL and URI that correspond to the webpage featured in the webpage request. AI engine 134 may use the identified URL and URI to access and further analyze the requested webpage.

At step 210, AI engine 134 may parse the webpage request to identify the URL and URI that correspond to the webpage featured in the webpage request. AI engine 134 may use at least one natural language processing (NLP) algorithm (e.g., a supervised machine learning model that may be configured to perform text classification) to distinguish the URL from the URI. AI engine 134 may use the at least one NLP algorithm to analyze the webpage request and to identify one or more key terms, characters, symbols, punctuation, or the like. For example, the at least one NLP algorithm may determine that all characters up to and including the top-level domain may comprise the URL (e.g., a protocol, a sub-domain, a domain name, or the like) and that all characters that follow the top-level domain may comprise the URI (e.g., a path, a port, a query, a parameter, or the like). In such instances, AI engine 134 may distinguish the URL from the URI based on the placement of various components.

Figure 2C:
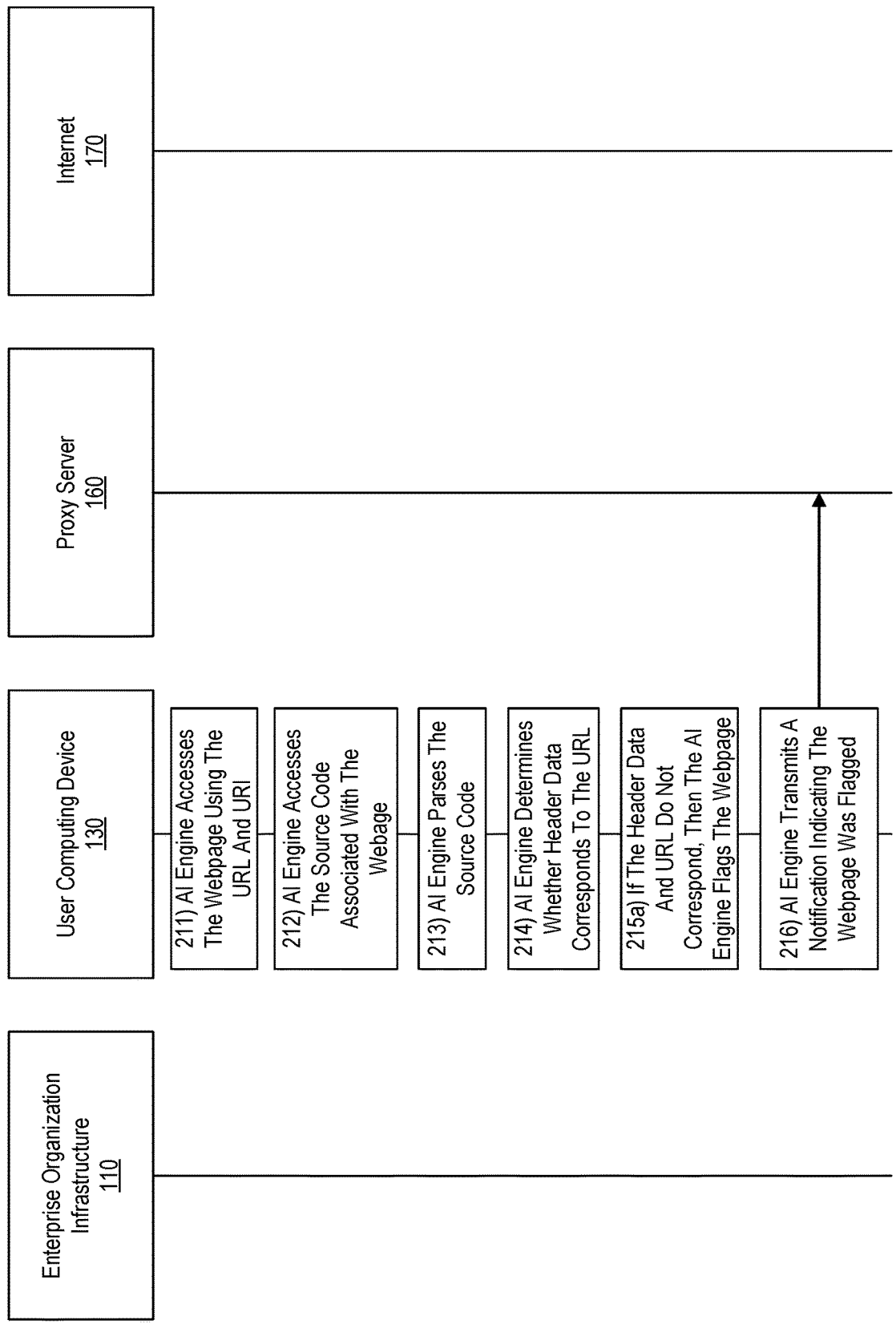

Referring to FIG. 2C, at step 211, AI engine 134 may use the parsed URL and URI associated with the webpage featured in the webpage request to access the featured webpage. AI engine 134 may launch a web browser using the connection between user computing device 130 and proxy server 160, as discussed in connection with step 201. AI engine 134 may transmit the URL and URI to proxy server 160 using the web browser and via network 140. AI engine 134 might not display the web browser on user interface 132 of user computing device 130 (e.g., user computing device 130 might not be permitted to view the requested webpage during the analysis steps described herein, but may be permitted to view the requested webpage upon determining, by AI engine 134, that the requested webpage satisfies the analysis described herein).

At step 212, AI engine 134 may access source code associated with the requested webpage. The source code associated with the requested webpage may identify data that is available on the requested webpage (e.g., header data, data that is displayed on the requested webpage, embedded hyperlinks, embedded files, or the like).

At step 213, AI engine 134 may parse the source code associated with the requested webpage. AI engine 134 may use at least one natural language processing (NLP) algorithm (e.g., a supervised machine learning model that may be configured to perform text classification) to distinguish and classify components within the source code. AI engine 134 may use the at least one NLP algorithm to analyze the source code and to identify one or more start tags, attributes, values, webpage content, end tags, symbols, punctuation, or the like. For example, the at least one NLP algorithm may determine that characters within a pair of open-angled brackets may represent a start tag (e.g., "<header>" may represent the beginning of header data), and that characters between a pair of open-angled brackets with a slash immediately following the first open-angled bracket may represent an end tag (e.g., "</header>" may represent the end of the header data). AI engine 134 may use the at least one NLP algorithm to identify header data that corresponds to the requested webpage. AI engine 134 may use the at least one NLP algorithm to identify words and/or phrases (e.g., to read the data contained between the start tag and the end tag).

At step 214, AI engine 134 may determine whether the header data within the source code corresponds to the URL associated with the requested webpage. To do so, AI engine 134 may compare the header data to the URL. The header data may correspond to the URL if the objective of the header data is similar to the concept addressed in the URL. Alternatively, the header data might not correspond to the URL if the objective of the header data is different from the concept addressed in the URL. For example, if the URL indicates the requested webpage is a gardening webpage, but the header data indicates the requested webpage displays information related to circumventing security protocols, then AI engine 134 may determine that the header data does not correspond to the URL.

If, at step 214, AI engine 134 determines that the header data does not correspond to the URL, then, at step 215a, AI engine 134 may flag the requested webpage as containing malicious, or potentially malicious, data that may jeopardize sensitive enterprise organization data. In such instances, AI engine 134 may determine the URI associated with the requested webpage may have been re-written (e.g., using embedded features associated with scripting languages). A URI that may have been re-written may suggest that a description of the requested webpage in the URI might not correspond to (e.g., may be different from) the data that is featured on the requested webpage. For example, AI engine 134 may determine that the URL indicates the requested webpage is a gardening webpage and that the URI indicates the requested webpage displays data specific to gardening in tropical climates, but that the header data indicates the gardening webpage may display methods of circumventing security protocols. As such, AI engine 134 may determine that the URI associated with the gardening webpage may have been re-written in an attempt to access malicious, or potentially malicious, data that may jeopardize sensitive enterprise organization data.

At step 216, AI engine 134 may transmit a notification to proxy server 160 indicating the requested webpage was flagged for containing malicious, or potentially malicious, data that may jeopardize sensitive enterprise organization data. AI engine 134 may communicate with proxy server 160 via network 140.

Figure 2D:
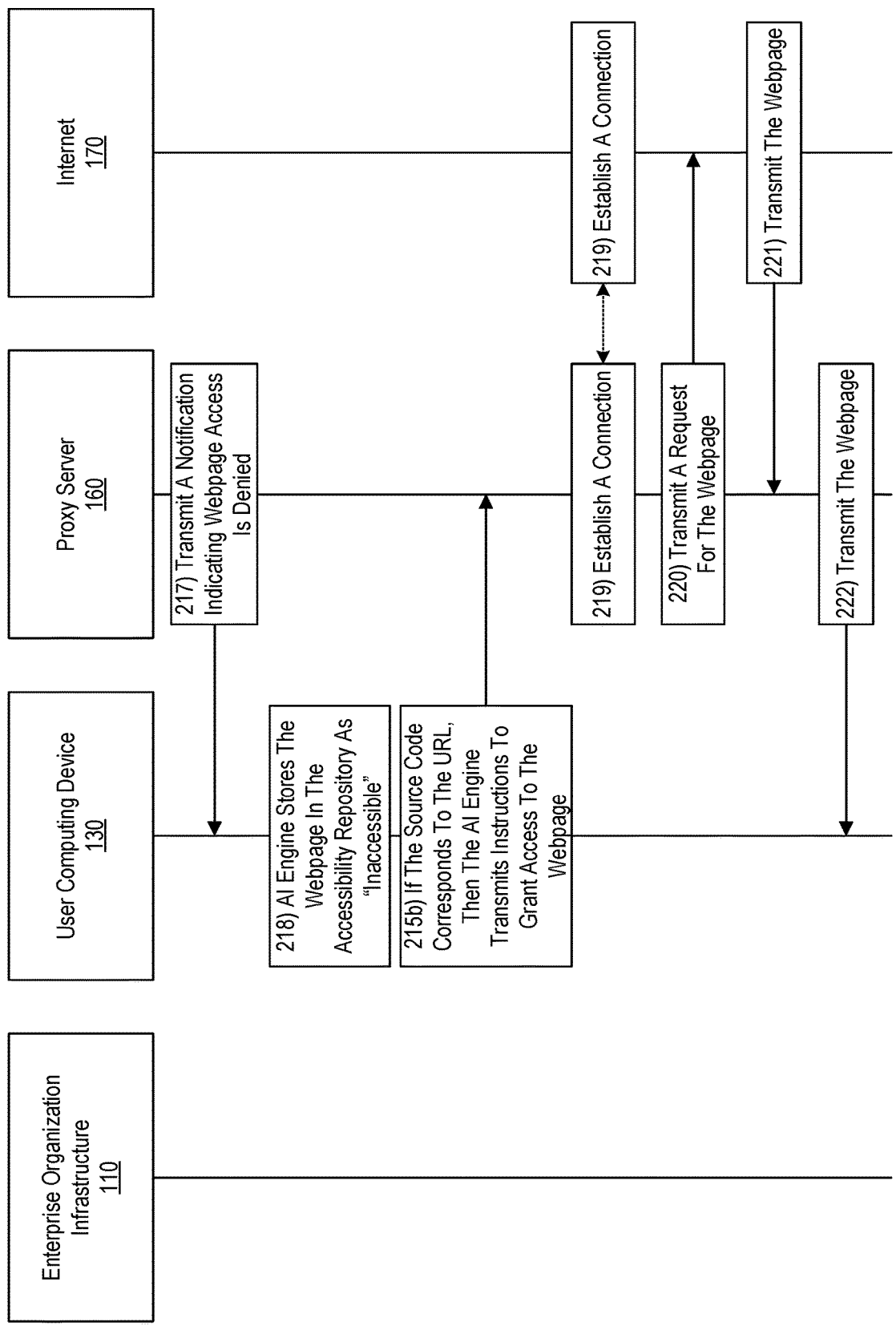

Referring to FIG. 2D, at step 217, proxy server 160 may receive the notification, from AI engine 134, indicating that the requested webpage was flagged for containing malicious, or potentially malicious, data that may jeopardize sensitive enterprise organization data. Proxy server 160 may transmit a notification to user computing device 130 indicating denial of the webpage request (e.g., due to the requested webpage being flagged, by AI engine 134, for containing malicious, or potentially malicious, data).

At step 218, AI engine 134 may store the requested webpage in accessibility repository 111 (e.g., on the deny list within accessibility repository 111). AI engine 134 may attach an accessibility indicator to the requested webpage to indicate that the requested webpage may be "inaccessible."

Alternatively, if, at step 214, AI engine 134 determines that the header data corresponds to the URL associated with the requested webpage, then, at step 215b, AI engine 134 may transmit a notification to proxy server 160 indicating that the requested webpage might not contain malicious, or potentially malicious, data that may jeopardize sensitive enterprise organization data. AI engine 134 may instruct proxy server 160 to retrieve the requested webpage and to transmit the requested webpage to user computing device 130.

At step 219, proxy server 160 may establish a network connection with internet 170. Proxy server 160 and internet 170 may communicate (e.g., transmit webpage requests, retrieve requested webpages, transmit webpages, or the like) via network 150.

At step 220, proxy server 160 may transmit the webpage request to internet 170 via network 150. At step 221, internet 170 may receive the webpage request from proxy server 160. Internet 170 may communicate with additional computing devices (e.g., within network 150, outside of network 150, or the like) to identify a computing device that may have access to (e.g., host) the requested webpage. Internet 170 may communicate with the computing device that may host the requested webpage and may retrieve the requested webpage from the host device. Internet 170 may transmit the requested webpage to proxy server 160 via network 150.

At step 222, proxy server 160 may receive, from internet 170, the transmission of the requested webpage via network 150. Proxy server 160 may transmit the requested webpage to user computing device 130 via network 140. In particular, server agent 161 may communicate with user agent 133 to transmit the requested webpage to user computing device 130. User agent 133 may communicate with user interface 132 to display the requested webpage to the user associated with user computing device 130.

Referring to FIG. 2E, at step 223, AI engine 134 may store the requested webpage in accessibility repository 111 (e.g., on the allow list within accessibility repository 111). AI engine 134 may attach an accessibility indicator to the requested webpage to indicate that the requested webpage may be "accessible." AI engine 134 may store the requested webpage in the portion of user baseline database 112 associated with user computing device 130.

At step 224, AI engine 134 may monitor the interaction between user computing device 130 and the requested webpage (e.g., whether user computing device is viewing the information on the requested webpage, accessing embedded hyperlinks, accessing embedded files, downloading embedded files, uploading data, or the like). AI engine 134 may identify an expected interaction between user computing device 130 and the requested webpage based on the header data. If the header data indicates that the data on the requested webpage is static textual data (e.g., the data displayed on the requested webpage is the only data available on the requested webpage, the requested webpage does not contain embedded hyperlinks, or the like), then AI engine 134 may expect a first level of interaction between user computing device 130 and the requested webpage (e.g., a low level of interaction since user computing device 130 may read the data displayed on the webpage, but might not be able to access additional data by clicking on an embedded hyperlink, to download embedded files, or the like). Alternatively, if the header data indicates that the data on the requested webpage is dynamic data (e.g., embedded data files, embedded hyperlinks, downloadable images, or the like), then AI engine 134 may expect a second level of interaction between user computing device 130 and the requested webpage (e.g., a greater level of interaction than the first level of interaction since user computing device 130 may be permitted to download data, access additional data, enlarge images, download images, or the like).

At step 225, AI engine 134 may determine whether the interaction between user computing device 130 and the requested webpage is similar to (e.g., matches) the expected level of interaction between user computing device 130 and the requested webpage.

If, at step 225, AI engine 134 determines that the interaction between user computing device 130 and the requested webpage is similar to the expected level of interaction, then, at step 226a, AI engine 134 may continue monitoring the interaction (e.g., until user computing device 130 terminates access to the requested webpage). For example, header data associated with the requested webpage may suggest that the requested webpage displays gardening information and that the requested webpage might not contain embedded files or embedded hyperlinks (e.g., the requested webpage might not contain information available for download, the requested webpage might not offer data other than what is displayed, or the like). As such, based on the header data, AI engine 134 may expect a first level of interaction between user computing device 130 and the requested webpage since user computing device 130 may be able to view the data displayed on the requested webpage, but might not be able to download data files or access additional gardening information. AI engine 134 may determine, based on the monitoring, that there is a first level of interaction between user computing device 130 and the requested webpage. As such, AI engine 134 may determine that the interaction between user computing device 130 and the requested webpage is similar to (e.g., matches) the expected interaction.

Figure 2F:
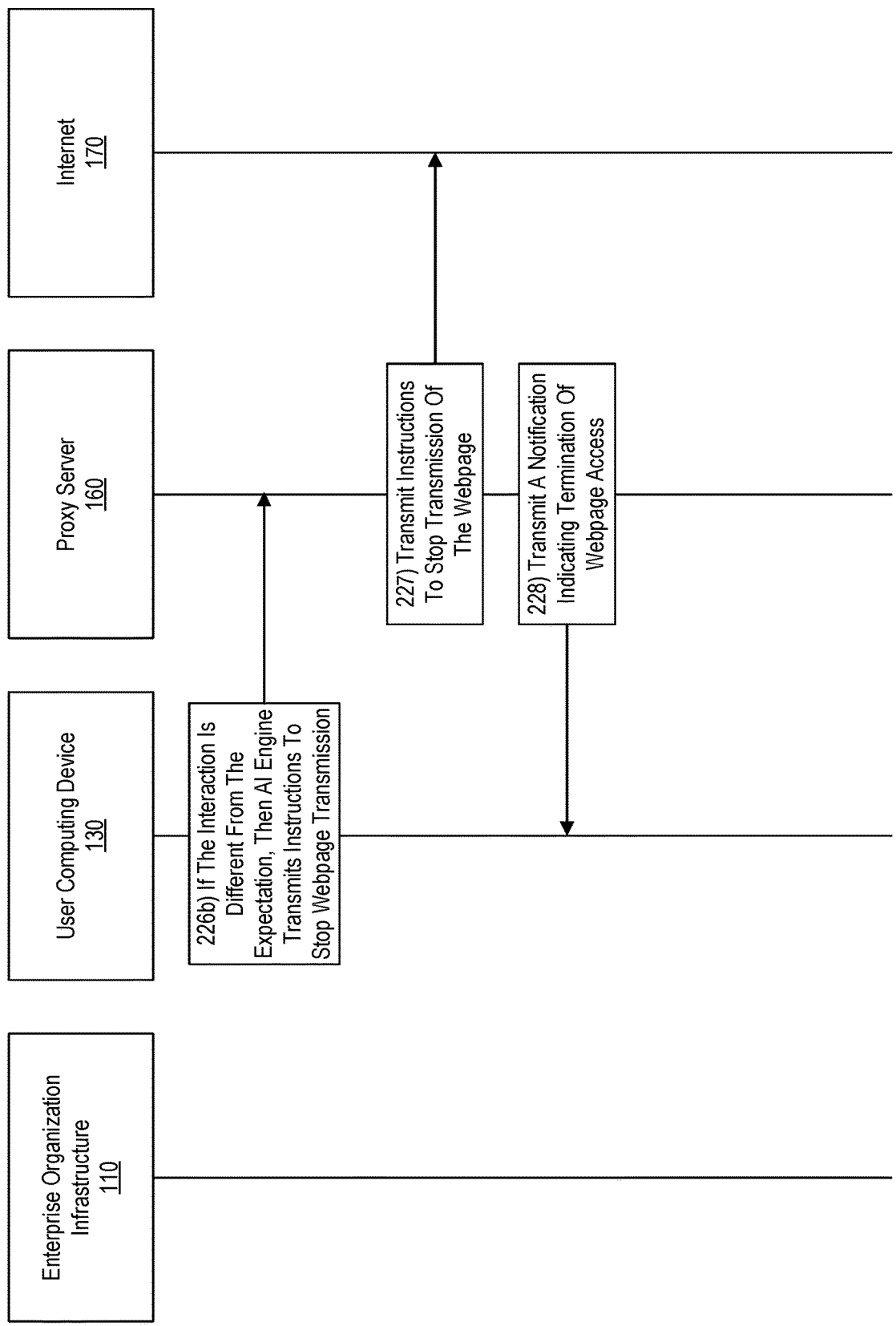

Referring to FIG. 2F, if, at step 225, AI engine 134 determines that the interaction between user computing device 130 and the requested webpage is different from (e.g., might not match) the expected level of interaction, then, at step 226b, AI engine 134 may instruct proxy server 160 to terminate the transmission of the requested webpage to user computing device 130. Taking the previous example, if AI engine 134 expects a first level of interaction between user computing device 130 and the requested webpage, but determines that there is a second level of interaction between user computing device 130 and the requested webpage, then AI engine 134 may determine that the requested webpage may contain malicious, or potentially malicious, data that may jeopardize sensitive enterprise organization data. In such instances, AI engine 134 may instruct proxy server 160 to terminate the transmission of the requested webpage.

At step 227, proxy server 160 may instruct internet 170 to terminate the transmission of the requested webpage. Internet 170 may terminate communications with the computing device that may host the requested webpage and, as such, may terminate the transmission of the requested webpage.

At step 228, proxy server 160 may transmit a notification to user computing device 130 indicating the termination of access to the requested webpage. In particular, server agent 161 may communicate with user agent 133 and user interface 132 to display the notification to the user associated with user computing device 130.

Figure 3A:
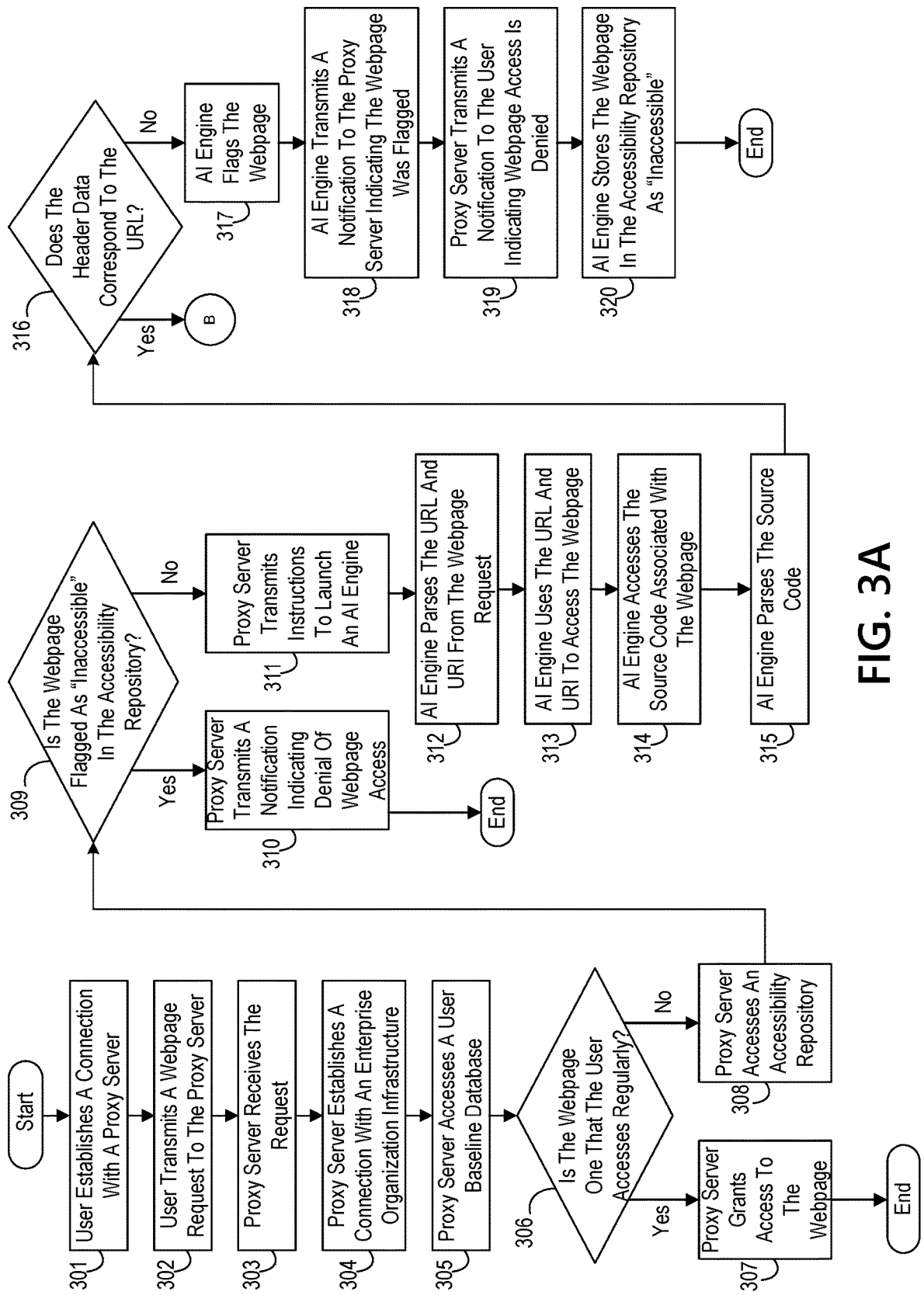
FIGS. 3A-3B depict an illustrative method for preventing data loss using enhanced analysis of the URLs and URIs in webpage requests, in accordance with one or more example embodiments.
Figure 3B:
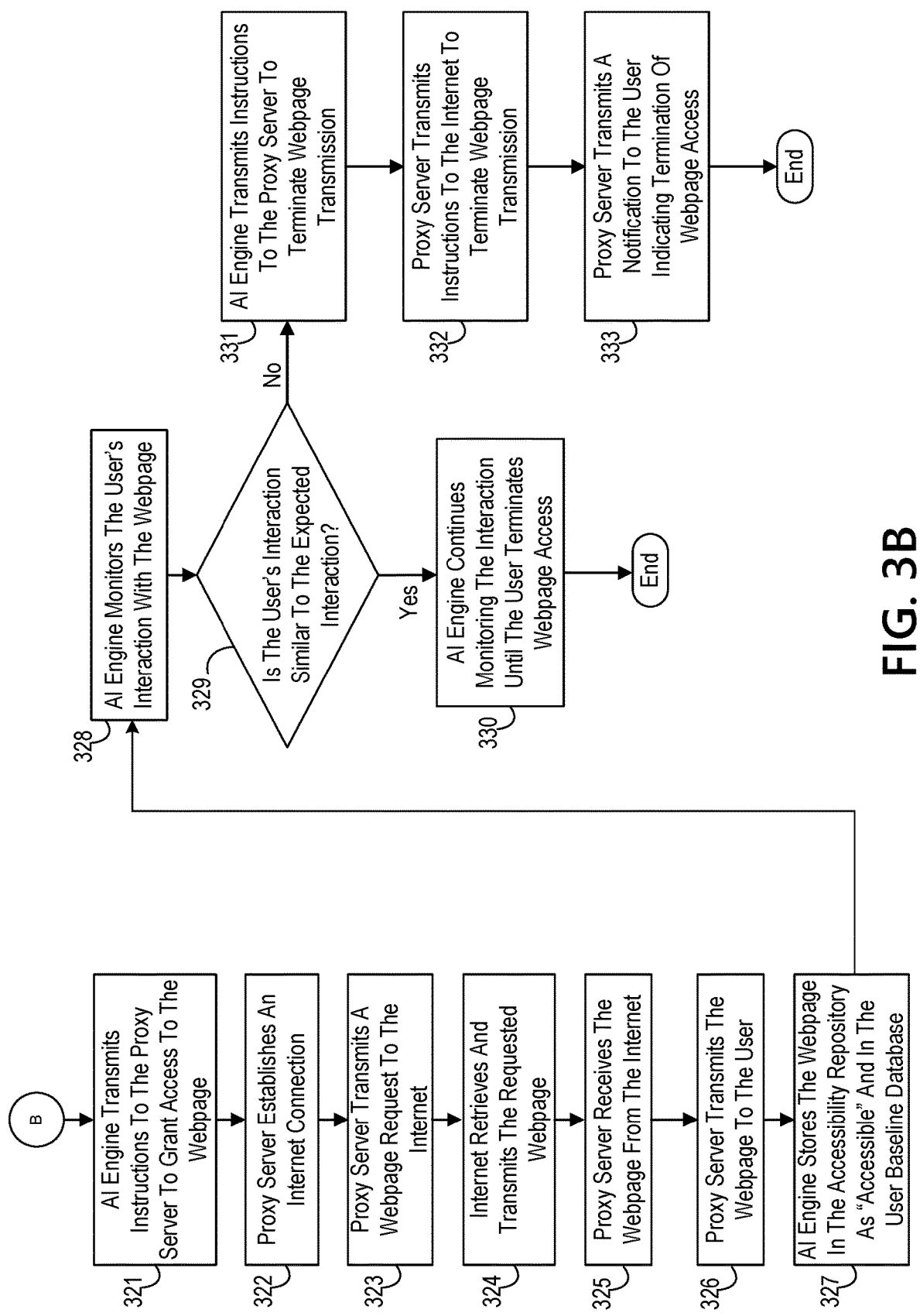

FIGS. 3A and 3B depict a flow diagrams illustrating one example method for preventing data loss using enhanced analysis of the URLs and URIs in webpage requests, in accordance with one or more aspects described herein. The processes illustrated in FIGS. 3A and 3B are merely sample processes and functions. The steps shown may be performed in the order shown, in a different order, more steps may be added, or one or more steps may be omitted, without departing from the invention. In some examples, one or more steps may be performed simultaneously with other steps shown and described. Further, one or more steps described with respect to FIGS. 3A and 3B may be performed in real-time or near real-time.

Referring to FIG. 3A, at step 301, user computing device 130 may establish a network connection with proxy server 160. User computing device 130 and proxy server 160 may communicate via network 140.

At step 302, user computing device 130 may generate and transmit, to proxy server 160 via network 140, a webpage request. User computing device 130 may launch a web browser and may input, using communication interface(s) 136, a URL and a URI that may be used to locate the requested webpage and to retrieve the requested webpage from its host web server.

At step 303, proxy server 160 may receive the webpage request from user computing device 130 via network 140. At step 304, proxy server 160 may establish a network connection with enterprise organization infrastructure 110. Proxy server 160 may communicate with enterprise organization infrastructure 110 via network 150.

At step 305, proxy server 160 may access user baseline database 112 within enterprise organization infrastructure 110. At step 306, proxy server 160 may determine, using user baseline database 112, whether user computing device 130, or the user associated therewith, regularly accesses the webpage featured in the webpage request. Proxy server 160 may locate the portion of user baseline database 112 that indicates the webpages that user computing device 130, or the user associated therewith, may access frequently, and may determine whether the webpage featured in the webpage request is also featured in the portion of user baseline database 112 that is associated with user computing device 130, or the user associated therewith.

If, at step 306, proxy server determines user computing device 130 regularly accesses the webpage featured in the webpage request, then, at step 307, proxy server 160 may grant the webpage request. Proxy server 160 may instruct internet 170 to locate the IP address associated with the requested webpage, retrieve the requested webpage from its host web server, and transmit the requested webpage to proxy server 160 via network 150, wherein proxy server 160 may transmit the requested webpage to user computing device 130 via network 140.

Alternatively, if, at step 306, proxy server 160 determines that user computing device 130 might not regularly access the webpage featured in the webpage request, then, at step 308, proxy server 160 may access accessibility repository 111. At step 309, proxy server 160 may determine, using accessibility repository 111, whether user computing device 130 is permitted to access the requested webpage (e.g., whether the requested webpage is flagged as "inaccessible").

If, at step 309, proxy server 160 determines the webpage featured in the webpage request is stored in accessibility repository 111 and is flagged as "inaccessible," then, at step 310, proxy server 160 may transmit a notification to user computing device 130 indicating denial of the webpage request. Alternatively, if, at step 309, proxy server 160 determines the webpage featured in the webpage request is either not stored in accessibility repository 111, or is stored in accessibility repository and is flagged as "accessible," then, at step 311, proxy server 160 may transmit instructions to user computing device 130 to launch AI engine 134.

At step 312, AI engine 134 may parse the webpage request to identify the URL and URI that correspond to the webpage featured in the webpage request. AI engine 134 may use at least one natural language processing (NLP) algorithm (e.g., a supervised machine learning model that may be configured to perform text classification) to distinguish the URL from the URI. AI engine 134 may use the at least one NLP algorithm to analyze the webpage request and to identify one or more key terms, characters, symbols, punctuation, or the like. AI engine 134 may distinguish the URL from the URI based on the placement of various components.

At step 313, AI engine 134 may use the parsed URL and URI associated with the webpage featured in the webpage request to access the featured webpage. AI engine 134 may launch a web browser using the connection between user computing device 130 and proxy server 160. AI engine 134 may transmit the URL and URI to proxy server 160 using the web browser and via network 140.

At step 314, AI engine 134 may access source code associated with the requested webpage. The source code associated with the requested webpage may identify data that is available on the requested webpage.

At step 315, AI engine 134 may parse the source code associated with the requested webpage. AI engine 134 may use at least one natural language processing (NLP) algorithm (e.g., a supervised machine learning model that may be configured to perform text classification) to distinguish and classify components within the source code. AI engine 134 may use the at least one NLP algorithm to analyze the source code and to identify one or more start tags, attributes, values webpage content, end tags, symbols, punctuation, or the like.

At step 316, AI engine 134 may determine whether the header data within the source code corresponds to the URL associated with the requested webpage. AI engine 134 may compare the header data to the URL. The header data may correspond to the URL if the objective of the header data is similar to the concept addressed in the URL. Alternatively, the header data might not correspond to the URL if the objective of the header data is different from the concept addressed in the URL.

If, at step 316, AI engine 134 determines that the header data does not correspond to the URL, then, at step 317, AI engine 134 may flag the requested webpage as containing malicious, or potentially malicious, data that may jeopardize sensitive enterprise organization data. In such instances, AI engine 134 may determine the URI associated with the requested webpage may have been re-written (e.g., using embedded features associated with scripting languages). A URI that may have been re-written may suggest that a description of the requested webpage in the URI might not correspond to (e.g., may be different from) the data that is featured on the requested webpage.

At step 318, AI engine 134 may transmit a notification to proxy server 160 indicating the requested webpage was flagged for containing malicious, or potentially malicious, data that may jeopardize sensitive enterprise organization data. At step 319, proxy server 160 may transmit a notification to user computing device 130 indicating denial of the webpage request in light of the requested webpage being flagged, by AI engine 134, for containing malicious, or potentially malicious, data. At step 320, AI engine 134 may store the requested webpage in accessibility repository 111 (e.g., on the deny list within accessibility repository 111). AI engine 134 may attach an accessibility indicator to the requested webpage to indicate that the requested webpage may be "inaccessible."

Alternatively, if, at step 316, AI engine 134 determines that the header data corresponds to the URL associated with the requested webpage, then, referring to FIG. 3B and at step 321, AI engine 134 may instruct proxy server 160 to grant access to the requested webpage. AI engine 134 may instruct proxy server 160 to retrieve the requested webpage and to transmit the requested webpage to user computing device 130.

At step 322, proxy server 160 may establish a network connection with internet 170. Proxy server 160 and internet 170 may communicate via network 150. At step 323, proxy server 160 may transmit the webpage request to internet 170 via network 150. At step 324, internet 170 may receive the webpage request from proxy server 160. Internet 170 may communicate with additional computing devices (e.g., within network 150, outside of network 150, or the like) to identify a computing device that may host the requested webpage. Internet 170 may retrieve the requested webpage from the host device. Internet 170 may transmit the requested webpage to proxy server 160 via network 150.

At step 325, proxy server 160 may receive, from internet 170, the transmission of the requested webpage via network 150. At step 326, proxy server 160 may transmit the requested webpage to user computing device 130 via network 140. At step 327, AI engine 134 may store the requested webpage in accessibility repository 111 (e.g., on the allow list within accessibility repository 111). AI engine 134 may attach an accessibility indicator to the requested webpage to indicate that the requested webpage may be "accessible." AI engine 134 may store the requested webpage in the portion of user baseline database 112 associated with user computing device 130.

At step 328, AI engine 134 may monitor the interaction between user computing device 130 and the requested webpage. AI engine 134 may identify an expected interaction between user computing device 130 and the requested webpage based on the header data (e.g., a first level of interaction between user computing device 130 and the requested webpage, a second level of interaction between user computing device 130 and the requested webpage, or the like).

At step 329, AI engine 134 may determine whether the interaction between user computing device 130 and the requested webpage is similar to (e.g., matches) the expected level of interaction between user computing device 130 and the requested webpage. If, at step 329, AI engine 134 determines that the interaction between user computing device 130 and the requested webpage is similar to the expected level of interaction, then, at step 330, AI engine 134 may continue monitoring the interaction (e.g., until user computing device 130 terminates access to the requested webpage).

Alternatively, if, at step 329, AI engine 134 determines that the interaction between user computing device 130 and the requested webpage is different from (e.g., might not match) the expected level of interaction, then, at step 331, AI engine 134 may instruct proxy server 160 to terminate the transmission of the requested webpage to user computing device 130. At step 332, proxy server 160 may instruct internet 170 to terminate the transmission of the requested webpage. Internet 170 may terminate communications with the computing device that may host the requested webpage and, as such, may terminate the transmission of the requested webpage. At step 333, proxy server 160 may transmit a notification to user computing device 130 indicating the termination of access to the requested webpage.

As a result, the proposed solution may provide at least the following benefits: 1) robust and real-time, or near real-time, protection against malicious, or potentially malicious, webpage content; 2) real-time, or near real-time, monitoring of webpage traffic; 3) real time, or near real time, comparison of header data and a URI; and 4) real time, or near real time, detection of URL and URI manipulation (e.g., re-writing).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, random access memory (RAM), and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   at a computing device including at least one or more processors and memory:
     transmitting, to a proxy server, a request to access a webpage;
     determining, that the webpage is not included in a baseline associated with a user;
     based on determining that the webpage is not included in the baseline associated with the user, determining, using an accessibility repository, that the webpage is accessible;
     based on determining that the webpage is accessible, instructing an artificial intelligence model to analyze the webpage;
     parsing, by the artificial intelligence model, a uniform resource locator (URL) and a uniform resource identifier (URI) associated with the request;
     determining, by the artificial intelligence model, that the URI fails to correspond to source code associated with the webpage;
     based on determining that the URI fails to correspond to the source code, flagging, by the artificial intelligence model, the webpage as malicious;
     transmitting, by the artificial intelligence model and to the proxy server, instructions to deny the request to access the webpage;
     storing, by the artificial intelligence model, the webpage in the accessibility repository; and
     transmitting a notification indicating denial of the request to access the webpage.

2. The method of claim 1, wherein the transmitting the request to access the webpage further comprises at least one of:
   transmitting the request, to an internet, across a public or private network; or
   transmitting the request, using an application programming interface (API) hosted on a user computing device.

3. The method of claim 1, wherein the baseline associated with the user indicates a plurality of webpages that the user accesses during interactions with an enterprise organization.

4. The method of claim 1, wherein the accessibility repository is comprised of an allow list of webpages and a deny list of webpages, and wherein:
   the allow list indicates a first plurality of webpages, identified by an enterprise organization, that the user is permitted to access; and
   the deny list indicates a second plurality of webpages, identified by the enterprise organization, that the user is not permitted to access.

5. The method of claim 4, wherein:
   the allow list is based on at least one of:
     a role, within the enterprise organization, associated with the user;
     a team, within the enterprise organization, associated with the user; or
     an industry associated with the enterprise organization; and
   the deny list is based on crawling the Internet, by the artificial intelligence model, to identify malicious webpages.

6. A computing platform comprising:
   at least one processor;
   a communication interface communicatively coupled to the at least one processor; and
   memory storing computer-readable instructions that, when executed by the at least one processor, cause the computing platform to:
     transmit, to a proxy server, a request to access a webpage;
     determine that the webpage is not included in a baseline associated with a user;

based on determining the webpage is not included in the baseline associated with the user, determine, using an accessibility repository, that the webpage is accessible;
based on determining that the webpage is accessible, instruct an artificial intelligence model to analyze the webpage;
parse, by the artificial intelligence model, a uniform resource locator (URL) and a uniform resource identifier (URI) associated with the request;
determine, by the artificial intelligence model, that the URI fails to corresponds to source code associated with the webpage;
based on determining that the URI fails to correspond to the source code, flag, by the artificial intelligence model, the webpage as malicious;
transmit, by the artificial intelligence model and to the proxy server, instructions to deny the request to access the webpage;
store, by the artificial intelligence model, the webpage in the accessibility repository; and
transmit a notification indicating denial of the request to access the webpage.

7. The computing platform of claim 6, wherein the transmitting the request to access the webpage further comprises at least one of:
transmitting the request, to the Internet, across a public or private network; or
transmitting the request, using an application programming interface (API) hosted on a user computing device.

8. The computing platform of claim 6, wherein the baseline associated with the user indicates a plurality of webpages that the user accesses during interactions with an enterprise organization.

9. The computing platform of claim 6, wherein the accessibility repository is comprised of an allow list of webpages and a deny list of webpages, and wherein:
the allow list indicates a first plurality of webpages, identified by an enterprise organization, that the user is permitted to access; and
the deny list indicates a second plurality of webpages, identified by the enterprise organization, that the user is not permitted to access.

10. The computing platform of claim 9, wherein:
the allow list is based on at least one of:
a role, within the enterprise organization, associated with the user;
a team, within the enterprise organization, associated with the user; or
an industry associated with the enterprise organization; and
the deny list is based on crawling the Internet, by the artificial intelligence model, to identify malicious webpages.

11. One or more non-transitory computer-readable media storing instructions that, when executed by a computing platform comprising at least one processor, memory, and a communication interface, cause the computing platform to:
transmit, to a proxy server, a request to access a webpage;
determine that the webpage is not included in a baseline associated with a user;
based on determining the webpage is not included in the baseline associated with the user, determine, using an accessibility repository, that the webpage is accessible;
based on determining the webpage is accessible, instruct an artificial intelligence model to analyze the webpage;
parse, by the artificial intelligence model, a uniform resource locator (URL) and a uniform resource identifier (URI) associated with the request;
determine, by the artificial intelligence model, that the URI fails to corresponds to source code associated with the webpage;
based on determining that the URI fails to correspond to the source code, flag, by the artificial intelligence model, the webpage as malicious;
transmit, by the artificial intelligence model and to the proxy server, instructions to deny the request to access the webpage;
store, by the artificial intelligence model, the webpage in the accessibility repository; and
transmit a notification indicating denial of the request to access the webpage.

12. The one or more non-transitory computer-readable media of claim 11, wherein the transmitting the request to access the webpage further comprises at least one of:
transmitting the request, to the Internet, across a public or private network; or
transmitting the request, using an application programming interface (API) hosted on a user computing device.

13. The one or more non-transitory computer-readable media of claim 11, wherein the baseline associated with the user indicates a plurality of webpages that the user accesses during interactions with an enterprise organization.

14. The one or more non-transitory computer-readable media of claim 11, wherein the accessibility repository is comprised of an allow list of webpages and a deny list of webpages, and wherein:
the allow list indicates a first plurality of webpages, identified by an enterprise organization, that the user is permitted to access; and
the deny list indicates a second plurality of webpages, identified by the enterprise organization, that the user is not permitted to access.

15. The one or more non-transitory computer-readable media of claim 14, wherein:
the allow list is based on at least one of:
a role, within the enterprise organization, associated with the user;
a team, within the enterprise organization, associated with the user; or
an industry associated with the enterprise organization; and
the deny list is based on crawling the Internet, by the artificial intelligence model, to identify malicious webpages.

\* \* \* \* \*